(12) United States Patent
Frolov

(10) Patent No.: US 10,695,849 B2
(45) Date of Patent: Jun. 30, 2020

(54) TABLE SAW WITH TWO STAGE TABLE EXTENSION SYSTEM

(71) Applicants: Robert Bosch Tool Corporation, Broadview, IL (US); Robert Bosch GmbH, Stuttgart (DE)

(72) Inventor: Andrew Frolov, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 15/898,957

(22) Filed: Feb. 19, 2018

(65) Prior Publication Data
US 2019/0255633 A1    Aug. 22, 2019

(51) Int. Cl.
*B23D 47/02* (2006.01)
*B23D 45/06* (2006.01)

(52) U.S. Cl.
CPC ............ *B23D 47/025* (2013.01); *B23D 45/06* (2013.01)

(58) Field of Classification Search
CPC ...... B23D 47/025; B23D 45/06; B27B 27/10; B23Q 3/005
USPC ....................................................... 83/477.2
See application file for complete search history.

(56) References Cited

U.S. PATENT DOCUMENTS

| | | | |
|---|---|---|---|
| 1,864,840 A * | 6/1932 | Lehner ..................... | B23Q 1/72 144/287 |
| 1,994,538 A * | 3/1935 | Segal ....................... | A47B 1/05 108/73 |
| 2,555,217 A | 5/1951 | Young | |
| 4,106,381 A | 8/1978 | Kreitz | |
| 4,406,200 A | 9/1983 | Kerr | |
| 4,964,450 A | 10/1990 | Hughes et al. | |
| 5,363,893 A | 11/1994 | Grochowicz | |
| 5,379,815 A | 1/1995 | Brazell et al. | |
| 5,526,856 A * | 6/1996 | Pedri ..................... | B23D 47/025 144/286.1 |
| 6,581,655 B2 * | 6/2003 | Huang ................. | B23D 47/025 144/287 |
| 6,581,656 B1 | 6/2003 | Harper | |
| 6,644,157 B2 * | 11/2003 | Huang ................. | B23D 47/025 144/287 |
| 6,647,847 B2 | 11/2003 | Hewitt et al. | |
| 6,668,696 B1 | 12/2003 | Krohmer et al. | |
| 6,736,042 B2 * | 5/2004 | Behne ................. | B23D 45/068 83/440.2 |
| 6,986,370 B1 | 1/2006 | Schoene et al. | |
| 7,036,414 B2 | 5/2006 | Behne et al. | |

(Continued)

*Primary Examiner* — Omar Flores Sanchez
(74) *Attorney, Agent, or Firm* — Maginot, Moore & Beck LLP

(57) ABSTRACT

A table saw includes a base assembly, a saw assembly, which is supported by the base assembly and includes a saw, and a table assembly supported by the base assembly. The table assembly includes a rip fence, a table extension system, and a table top defining an opening through which the saw extends. The table extension system includes a first stage assembly supported by the table top and movable relative to the table top between a first stage retracted position and a first stage extended position, and a second stage assembly supported by the first stage assembly and movable relative to the first stage assembly between a second stage retracted position and a second stage extended position. The rip fence is supported by and movable relative to the second stage assembly.

16 Claims, 15 Drawing Sheets

(56) References Cited

U.S. PATENT DOCUMENTS

| | | | |
|---|---|---|---|
| 7,210,510 B2* | 5/2007 | Barclay deTolly | B25H 1/06 144/269 |
| 7,387,120 B2 | 6/2008 | O'Banion et al. | |
| 7,441,487 B2 | 10/2008 | Liu et al. | |
| 7,647,956 B1 | 1/2010 | Cona et al. | |
| 8,418,591 B2 | 4/2013 | Frolov | |
| 9,403,284 B2* | 8/2016 | Liu | B27B 27/02 |
| 9,527,144 B2* | 12/2016 | Frolov | B23D 47/02 |
| 9,731,362 B2 | 8/2017 | Ceroll et al. | |
| 9,776,261 B2 | 10/2017 | Wiker et al. | |
| 10,092,968 B2* | 10/2018 | Fulmer | B23D 45/06 |
| 2005/0217446 A1 | 10/2005 | Brazell et al. | |
| 2006/0144203 A1 | 7/2006 | Behne et al. | |
| 2006/0266181 A1* | 11/2006 | Liu | B23D 47/025 83/438 |
| 2007/0084323 A1* | 4/2007 | Parks | B23D 47/025 83/468.3 |
| 2010/0050840 A1* | 3/2010 | Jesberger | B23D 47/025 83/156 |
| 2011/0017041 A1* | 1/2011 | Frolov | B23D 47/025 83/477.2 |
| 2011/0061509 A1* | 3/2011 | Scherl | B23D 47/025 83/474 |
| 2013/0133496 A1* | 5/2013 | Frolov | B23D 47/02 83/477 |
| 2014/0265102 A1* | 9/2014 | Frolov | B23D 47/025 269/309 |
| 2015/0273723 A1 | 10/2015 | Gass et al. | |
| 2016/0121412 A1* | 5/2016 | Fulmer | B23D 45/06 83/477.2 |
| 2016/0243632 A9* | 8/2016 | Fulmer | B23D 45/06 |
| 2017/0320151 A1* | 11/2017 | Chiang | B23D 45/06 |
| 2018/0036902 A1* | 2/2018 | Frolov | B23D 47/025 |
| 2019/0091780 A1* | 3/2019 | Fulmer | B23D 45/06 |
| 2019/0308258 A1* | 10/2019 | Shiel | B27B 27/02 |

* cited by examiner

TABLE SAW WITH TWO STAGE TABLE EXTENSION SYSTEM

TECHNICAL FIELD

This disclosure relates generally to a table saw, and, more particularly, to a table extension for a table saw.

BACKGROUND

Table saws are often used in the construction industry. In particular, at a construction jobsite where workers cut and shape a large number of wood products portable table saws are used. For example, framers use portable table saws for rough-cutting lumber, while finishing carpenters use portable power saws capable of making rip and miter cuts for producing precise finishing cuts of trim pieces.

Portable table saws are enable workers at a jobsite to make rip and miter cuts on site, without having to return to a workshop. However, the capacity of conventional table saws to cut larger workpieces is limited by the size of the saw, the distance by which the rip fence is extendable from the table saw, and the size and design of the extension table of the portable table saw.

In general, conventional portable table saws have a trade-off for portability and the size of workpieces that can be cut with the saw due to the increased size required for larger rip fences and extension tables. For instance, some cabinetry saw have very long rails for extending the rip fence and very high rip cutting capacity, but due to the large cutting capacity such saws are stationary and not portable to move to job sites.

What is needed, therefore, is a portable table saw that provides capacity to cut larger workpieces.

SUMMARY

In one embodiment, a table saw includes a base assembly, a saw assembly, which is supported by the base assembly and includes a saw, and a table assembly supported by the base assembly. The table assembly includes a rip fence, a table extension system, and a table top defining an opening through which the saw extends. The table extension system comprises a first stage assembly supported by the table top and movable relative to the table top between a first stage retracted position and a first stage extended position, and a second stage assembly supported by the first stage assembly and movable relative to the first stage assembly between a second stage retracted position and a second stage extended position. The rip fence is supported by and movable relative to the second stage assembly.

In some embodiments, the saw defines a cutting plane, the first stage assembly is movable relative to the table top in a first direction perpendicular to the cutting plane, and the second stage assembly is movable relative to the first stage assembly in the first direction.

In further embodiments, the table assembly further comprises two rail supports supported on opposite sides of the table top, and the first stage assembly comprises two first stage rails, each of which is supported by a respective one of the two rail supports and is configured to be movable relative to the two rail supports in the first direction.

In some embodiments of the table saw, the second stage assembly comprises two second stage rails, each of which is supported by a respective one of the two first stage rails and is configured to be movable relative to the respective one of the two first stage rails in the first direction, the rip fence being supported by the two second stage rails.

In another embodiment, the table extension of the table saw further comprises a second stage lock mechanism having a locked state in which the second stage assembly is fixed relative to the first stage assembly and an unlocked state in which the second stage assembly is movable relative to the first stage assembly in the first direction.

Additionally, in some embodiments of the table saw, at least one second stage rail of the two second stage rails comprises a side wall, a first boss extending from the side wall, and a second boss extending from the side wall. The second stage lock mechanism includes a locking member configured to interact with the first boss to lock the second stage assembly in the second stage extended position and to interact with the second boss to lock the second stage assembly in the second stage retracted position.

In one embodiment of the table saw, at least one first stage rail of the two first stage rails includes a first portion that defines an interior channel extending along a longitudinal length of the at least one first stage rail. The at least one second stage rail further comprises a guide boss extending from the side wall and which is positioned in the interior channel, the guide boss being movable within the interior channel in the first direction and the at least one second stage rail being pivotable about the guide boss when the second stage lock mechanism is unlocked.

In another embodiment, the first portion of the at least one first stage rail defines a first notch that opens into the interior channel and a second notch that opens into the interior channel. The first boss is configured be positioned in the second notch so as to interact with the first portion of the at least one first stage rail to disable movement of the second stage assembly in the first direction when the second stage assembly is in the second stage extended position. The first boss is configured to be positioned in the first notch and the second boss is configured to be positioned in the second notch such that the first and second bosses interact with the first portion of the at least one first stage rail to disable movement of the second stage assembly in the first direction when the second stage assembly is in the second stage retracted position.

In another embodiment, when the second stage lock mechanism is unlocked, the at second stage assembly is pivotable relative to the first stage assembly about the guide boss from a first position, in which at least one of the first and second bosses is in at least one of the first and second notches, to a second position, in which the first and second notches are not in either of the first and second notches and the second stage assembly is movable in the first direction between the second stage retracted and second stage extended positions.

In some embodiments, the first stage assembly further comprises a cross member connecting the two first stage rails to one another in such a way that the two first stage rails and the cross member move together as a first rigid assembly, and the second stage assembly further comprises an extension table connecting the two second stages to one another in such a way that the two second stage rails and the extension table move together as a second rigid assembly.

In one embodiment of the table saw, the table top includes a workpiece support surface that defines a first plane, the extension table includes a planar surface that is coplanar with the first plane, the cross member has an L-shaped cross-section, and an uppermost edge of the L-shaped cross-section is in the first plane.

In a further embodiment of the table saw, in the second stage retracted position, a portion of the extension table is directly above a portion of the cross member.

In another embodiment, a table extension system for a table saw, comprises a first stage assembly and a second stage assembly. The first stage assembly is configured to be supported by a table top of the table saw, and the first stage assembly movable relative to the table top between a first stage retracted position and a first stage extended position. The second stage assembly is supported by the first stage assembly and movable relative to the first stage assembly between a second stage retracted position and a second stage extended position. Additionally, the second stage assembly is configured to support a rip fence of the table saw in such a way that the rip fence is movable relative to the second stage assembly.

In one embodiment of the table extension system, the first stage assembly is movable relative to the table top in a first direction perpendicular to a cutting plane defined by a saw of the table saw, and the second stage assembly is movable relative to the first stage assembly in the first direction.

In a further embodiment, the first stage assembly comprises two first stage rails, each of which is supported by a respective one of two rail supports that are supported on opposite sides of the table top. Each of the two first stage rails is movable relative to the two rail supports in the first direction.

In some embodiments of the table extension system, the second stage assembly comprises two second stage rails, each of which is supported by a respective one of the two first stage rails and is configured to be movable relative to the respective one of the two first stage rails in the first direction. The two second stage rails configured to support the rip fence.

Some embodiments of the table extension system further comprise a second stage lock mechanism having a locked state in which the second stage assembly is fixed relative to the first stage assembly and an unlocked state in which the second stage assembly is movable relative to the first stage assembly in the first direction.

In another embodiment of the table extension system at least one second stage rail of the two second stage rails comprises a side wall, a first boss extending from the side wall, and a second boss extending from the side wall. The second stage lock mechanism includes a locking member configured to interact with the first boss to lock the second stage assembly in the second stage extended position and to interact with the second boss to lock the second stage assembly in the second stage retracted position.

In a further embodiment, at least one first stage rail of the two first stage rails includes a first portion that defines an interior channel extending along a longitudinal length of the at least one first stage rail, and the at least one second stage rail further comprises a guide boss extending from the side wall and which is positioned in the interior channel. The guide boss is movable within the interior channel in the first direction and the at least one second stage rail is pivotable about the guide boss when the second stage lock mechanism is unlocked.

In an additional embodiment of the table extension system, the first portion of the at least one first stage rail defines a first notch and a second notch, each of which opens into the interior channel. The first boss is configured be positioned in the second notch so as to interact with the first portion of the at least one first stage rail to disable movement of the second stage assembly in the first direction when the second stage assembly is in the second stage extended position. The first boss is configured to be positioned in the first notch and the second boss is configured to be positioned in the second notch such that the first and second bosses interact with the first portion of the at least one first stage rail to disable movement of the second stage assembly in the first direction when the second stage assembly is in the second stage retracted position. When the second stage lock mechanism is unlocked, the at second stage assembly is pivotable relative to the first stage assembly about the guide boss from a first position, in which at least one of the first and second bosses is in at least one of the first and second notches, to a second position, in which the first and second notches are not in either of the first and second notches and the second stage assembly is movable in the first direction between the second stage retracted and second stage extended positions.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As used herein, the phrase "approximately equal" is used to refer to all values that are within 10% of the largest referenced value. The terms "slightly less than" or "slightly greater than" are defined to include all values within 10% less than or 10% greater than, respectively, of the reference value. As used herein, the terms "substantially parallel" and "substantially perpendicular" refer to two elements that are between 0 and 15 degrees, inclusive, of being parallel or perpendicular, respectively, to one another.

Figure 1:
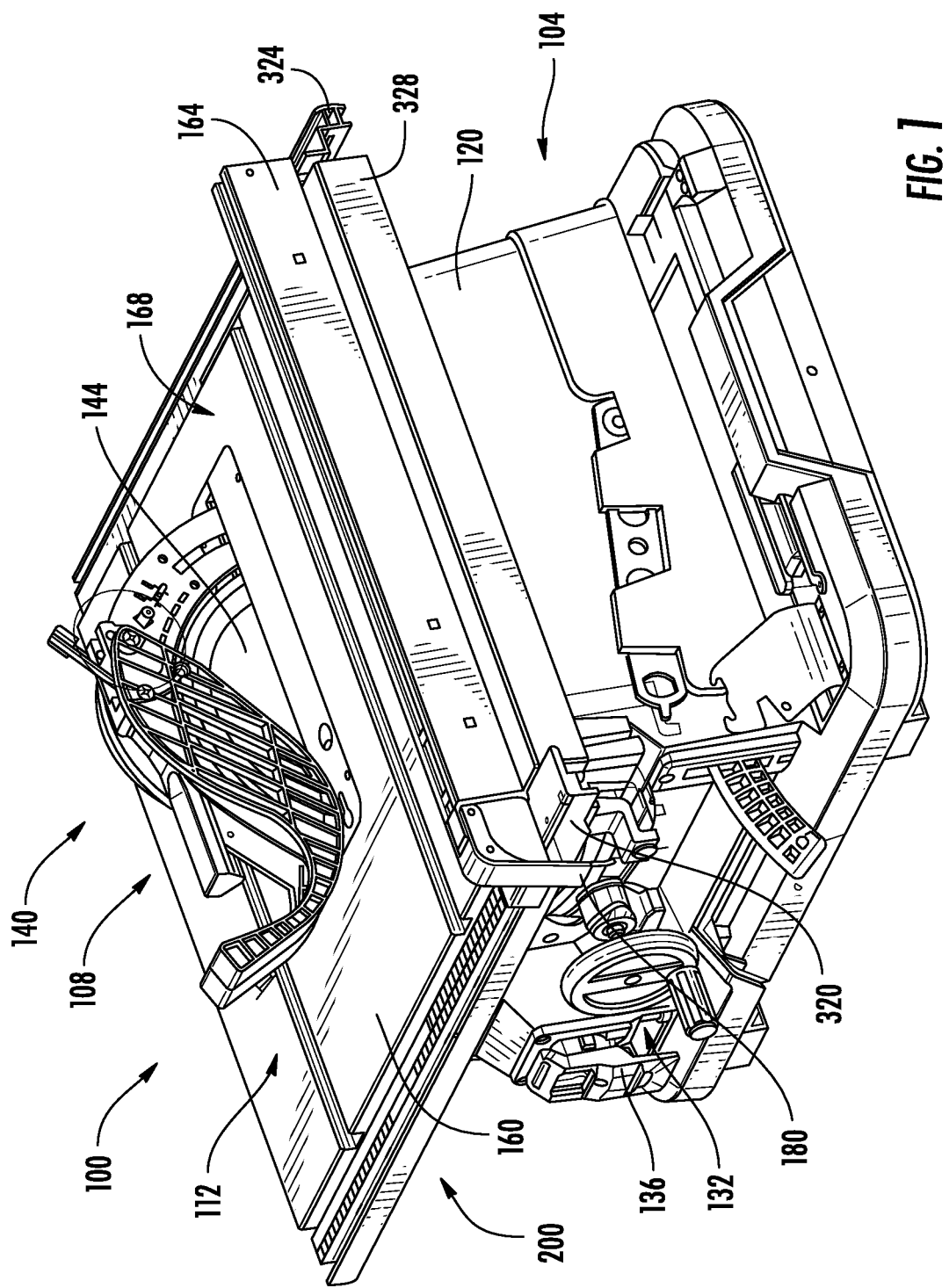
FIG. 1 is a front perspective view of a table saw having a table extension system in the retracted position.
Figure 2:
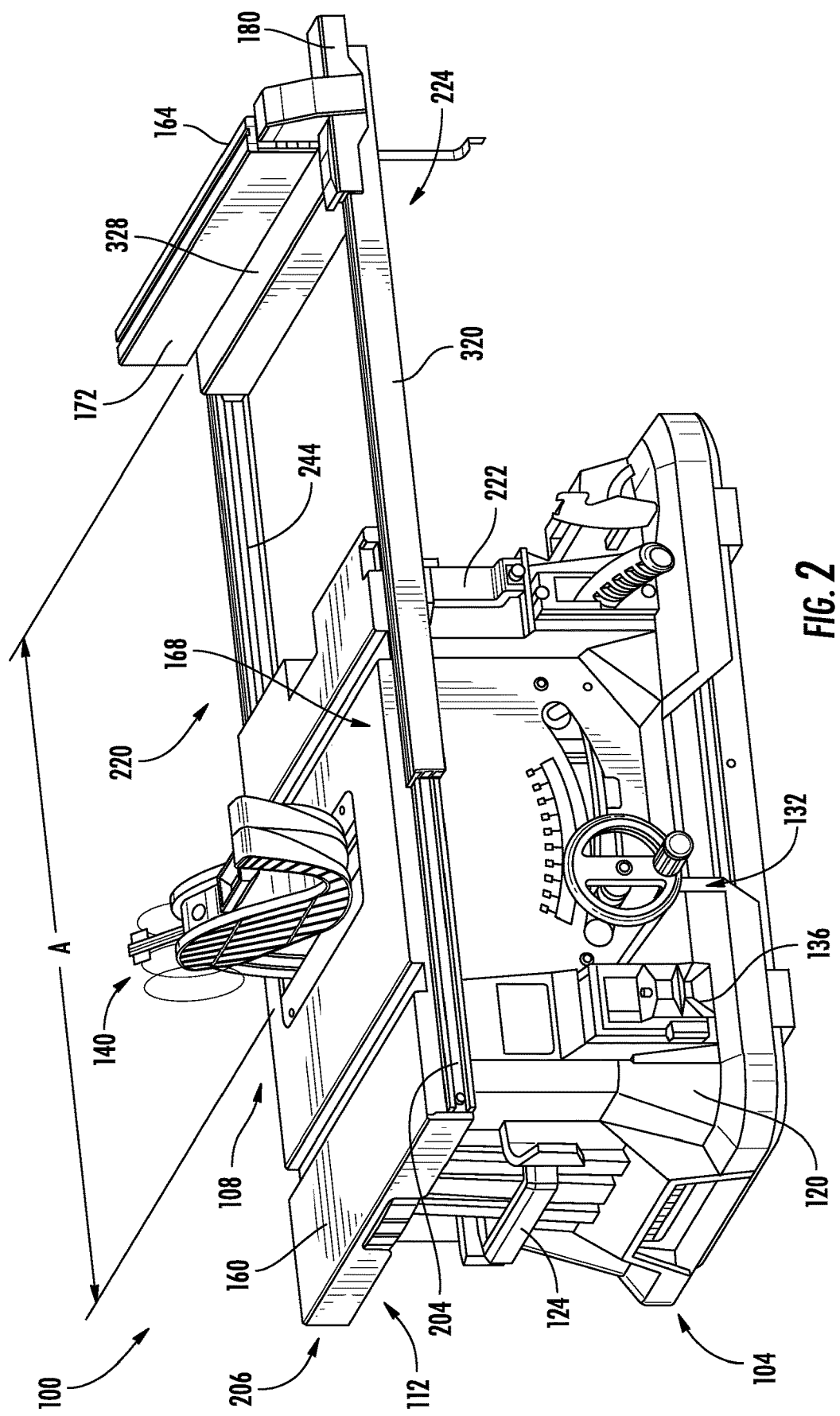
FIG. 2 is a front perspective view of the table saw of FIG. 1 in which the first stage assembly of the table extension system is extended and the second stage assembly of the table extension system is retracted.
Figure 3:
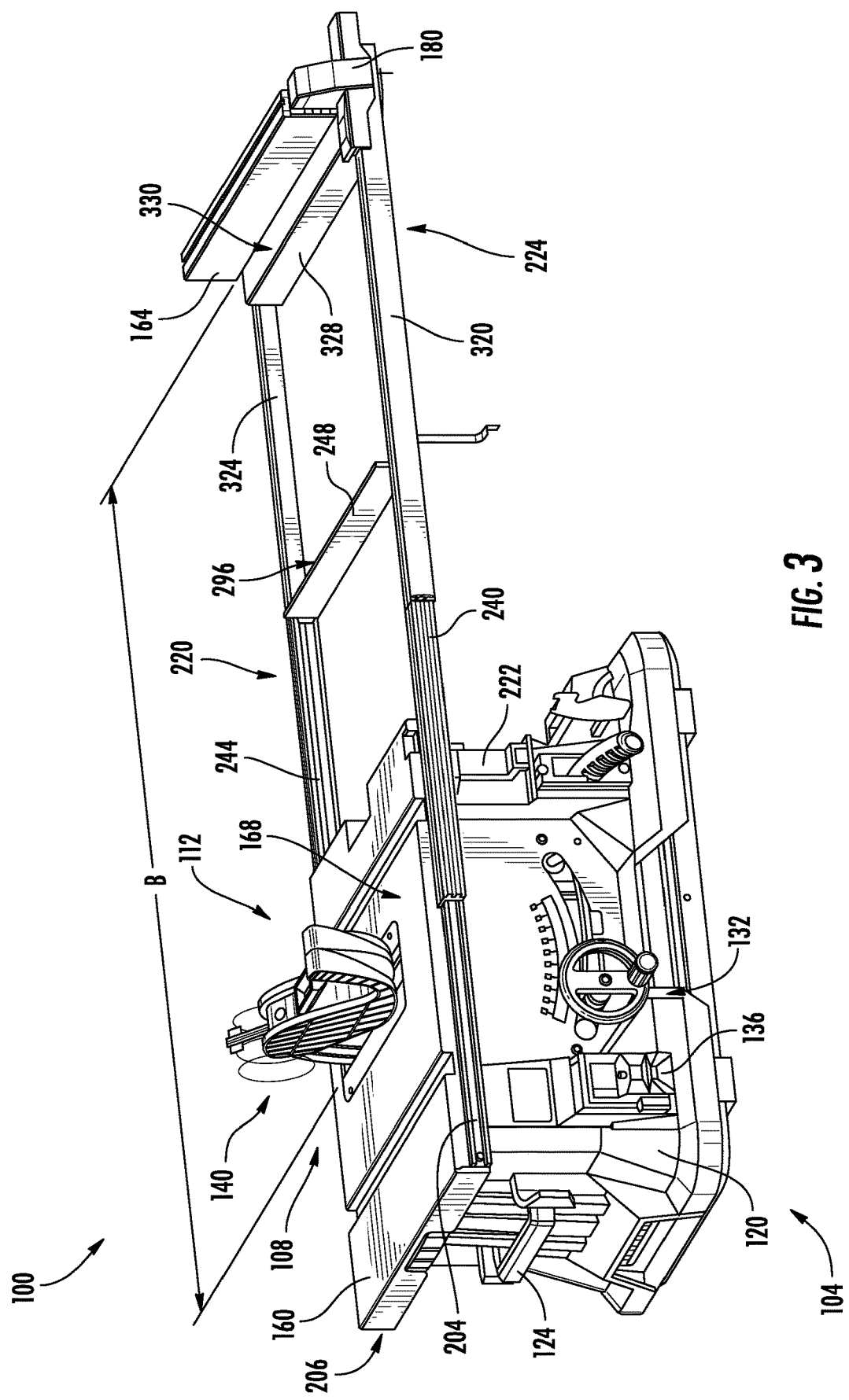
FIG. 3 is a front perspective view of the table saw of FIG. 1 in which both the first and second stage assemblies of the table extension system are extended.

FIGS. 1-3 illustrate a table saw 100 having an extension table system that provides extension of the cutting surface. The table saw 100 includes a base assembly 104, a saw assembly 108, and a table assembly 112. The base assembly 104 is configured to support the saw assembly 108 and the table assembly 112. The base assembly includes a housing 120 having one or more handles 124 that enable a user to easy transport the table saw 100. In addition, the base assembly 104 includes a saw positioning system 132 configured to raise, lower, and pivot the saw assembly 108, and a power switch 136 that is actuated to activate and deactivate the motor of the saw assembly 108.

The saw assembly 108 includes a motor (not shown) located in the housing 120 and a saw 140 located partially in the housing 120. The saw 140 includes a removable saw blade 144, which extends through the table assembly 112 and is operably connected to the motor via, for example, a power train assembly (not shown) such that activation of the motor causes the saw blade 144 to rotate to cut a workpiece on the table assembly 112. The saw 140 is configured to cut along a cutting plane that is coincident with the saw blade 144 when the saw blade 144 is installed.

The table assembly 112 includes a table top 160, a rip fence 164, and a table extension system 200. The table top 160 defines a workpiece support surface 168 on which a workpiece is supported so that the workpiece can be moved through the rotating saw blade 144 to cut the workpiece. The rip fence 164 has a guide surface 172 and a rip fence lock 180. The guide surface 172 abuts the side of the workpiece during a rip cut so as to guide the workpiece as the workpiece is fed into the saw blade 144. As will be discussed in further detail below, the rip fence 164 moves along the table extension system 200, and the rip fence lock 180 locks the rip fence 164 in a desired position relative to the saw blade 144 to enable the saw 140 to be used for cuts of various widths.

The table extension system 200 includes a front rail support 204 fixedly attached to the front of the table top 160, and a rear rail support 206 fixedly attached to the rear of the table top 160. In addition, the table extension system 200 includes a first stage assembly 220, a first stage locking mechanism 222, a second stage assembly 224, and a second stage locking mechanism 228. The first stage assembly 220 has a first stage front rail 240, a first stage rear rail 244, and a cross member 248 (FIG. 3).

Figure 4:
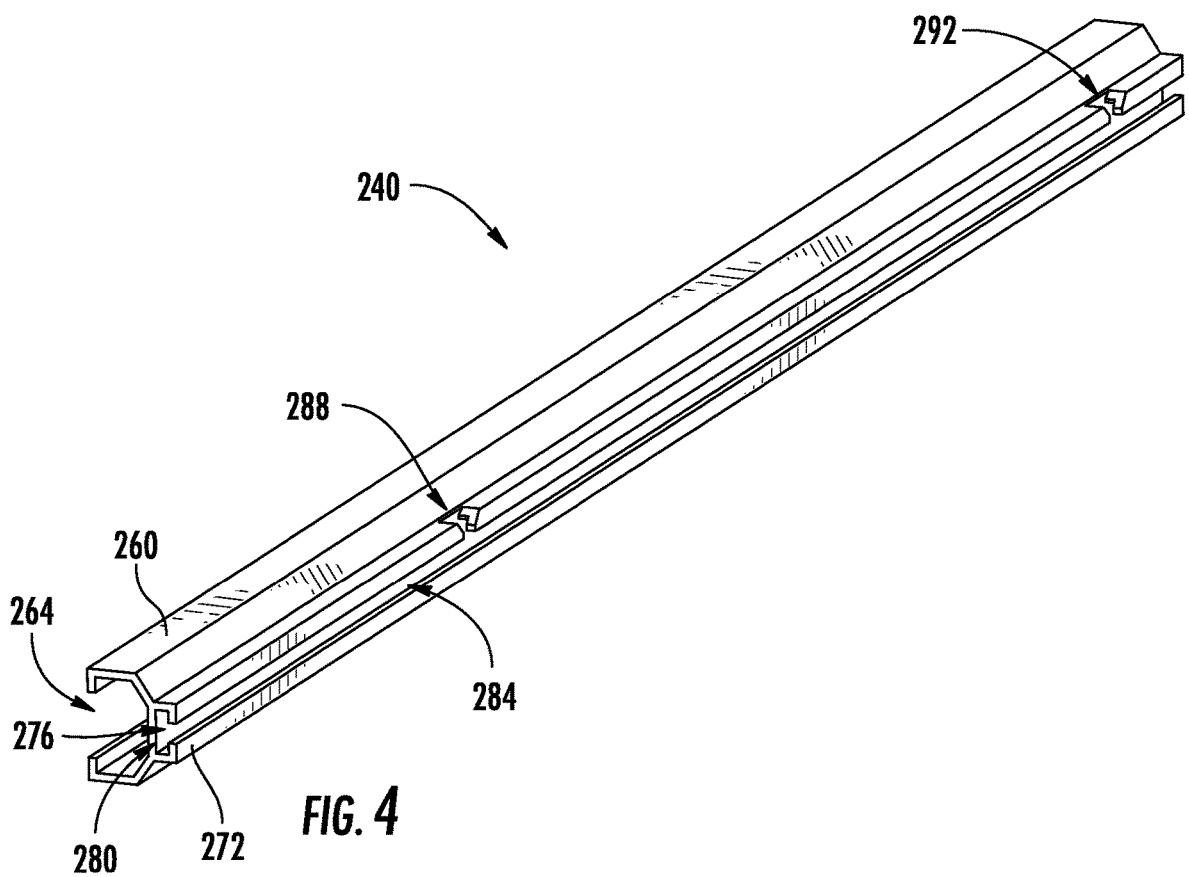
FIG. 4 is a front perspective view of a front first stage rail of the first stage assembly of the table saw of FIG. 1.

With continuing reference to FIG. 1 and further reference to FIG. 4, the first stage front rail 240 includes an inside portion 260 that defines an interior C-shaped channel 264. The inside portion 260 faces toward the table top 160 and is configured such that the front rail support 204 engages the inside portion 260 within the interior C-shaped channel 264 to support the first stage front rail 240 in such a way that the first stage front rail 240 can move left and right (as seen from the front of the saw) relative to the table top 160 when the first stage locking mechanism 222 is unlocked.

Figure 5:
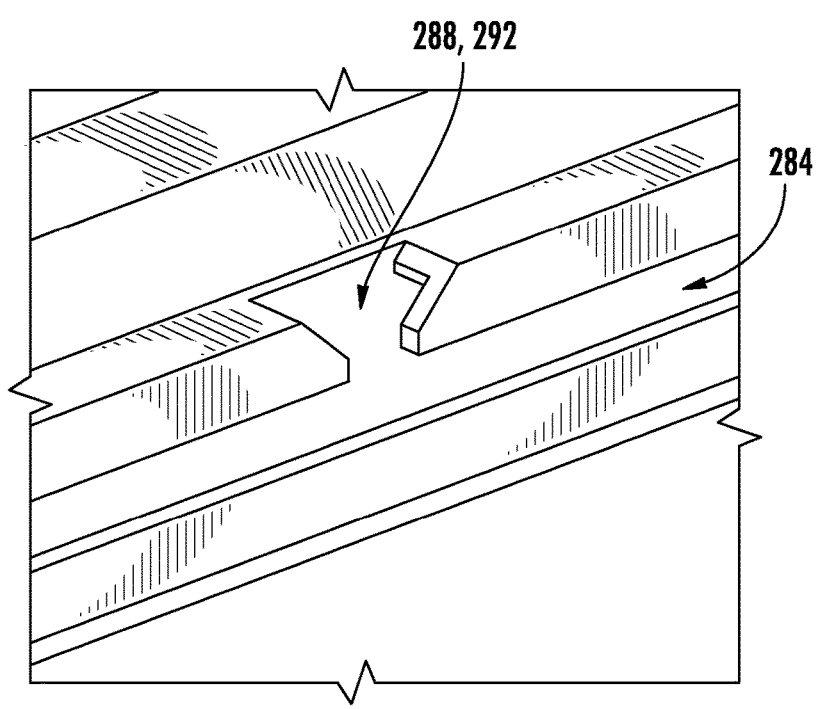
FIG. 5 is a detail view of a notch in the first stage rail of FIG. 4.

Referring now to FIGS. 4 and 5, the front side of the first stage front rail 240 includes an exterior portion 272 on the opposite side from the interior C-shaped channel 264. The exterior portion 272 defines an exterior C-shaped channel 276 has an internal channel portion 280 and a slot 284 extending along the entire length of the exterior portion 272. The exterior portion 272 also defines a first notch 288 and a second notch 292, each of which extends from the top side of the exterior portion 272 and opens into the internal channel portion 280 and the slot 284. Each notch 288, 292 has a greater width at the top side of the exterior portion 272 opening into the internal channel portion 280 than the width of the notch 288, 292 adjacent to the slot 284. In the illustrated embodiment, two identical notches 288 and 292 are illustrated, though the reader should appreciate that the exterior portion may include more than two notches and the notches may have different shapes.

The first stage rear rail 244 is substantially identical to the first stage front rail 240, but is mirrored about a vertical plane extending lengthwise along the first stage front rail 240. Thus, the interior portion of the first stage rear rail 244 faces toward the front of the saw 100 so as to slidably engage the rear rail support 206, while the exterior portion of the first stage rear rail 244 faces away from the table top 160.

Figure 11:
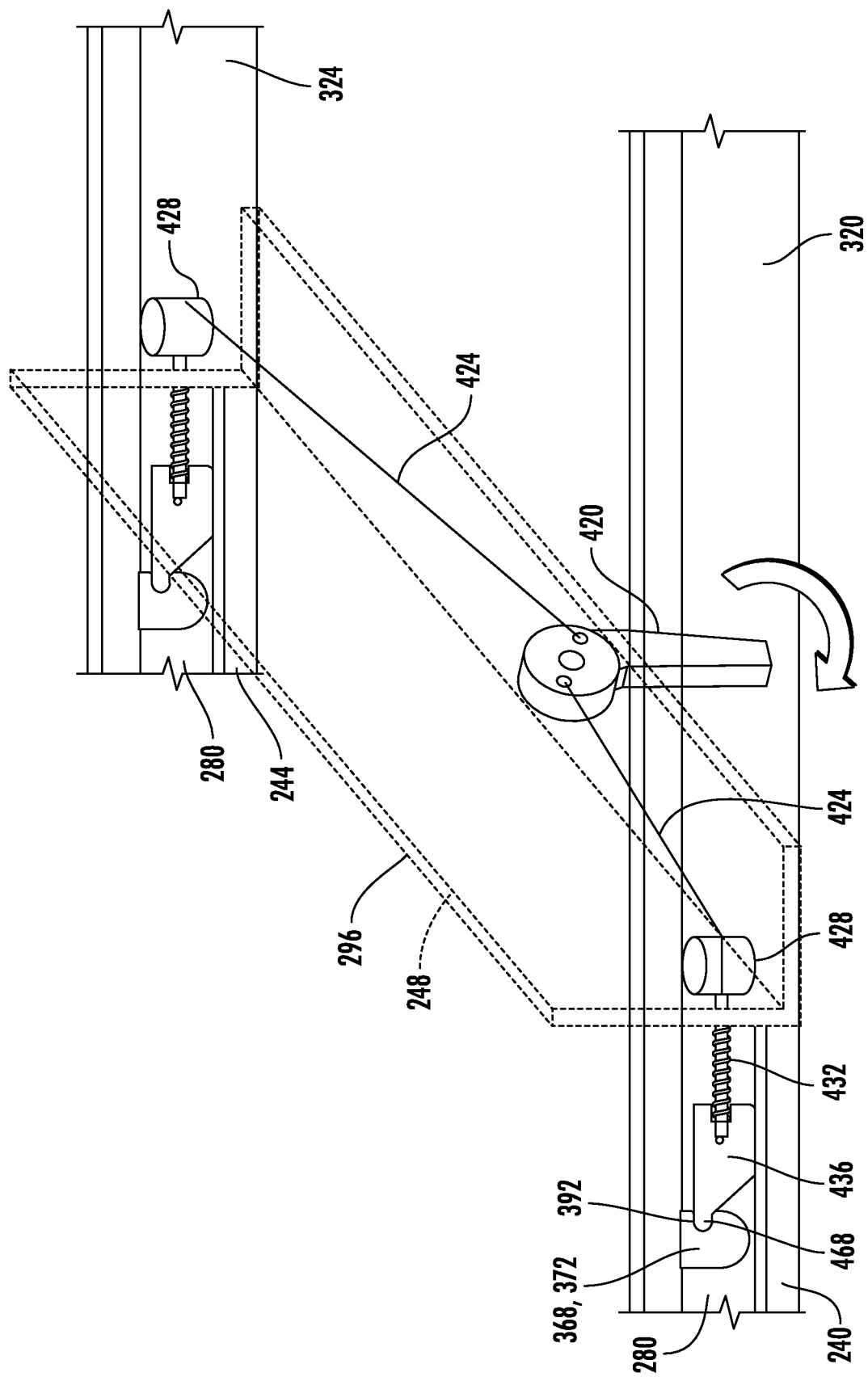
FIG. 11 is a front perspective view of the second stage locking mechanism of the table extension system of FIG. 1.

Referring now to FIGS. 3 and 4, the cross member 248 is rigidly connected to the first stage front and rear rails 240, 244 at the end adjacent to the second notches 292 of the first stage front and rear rails 240, 244. The first stage front and rear rails 244 and the cross member 248 thus form a rigid assembly. As a result, when the first stage locking mechanism 222 is unlocked, the first stage assembly 220 moves as a unit along the support rails 204, 206 so as to slide to the left or right. When the first stage locking mechanism 222 is locked, the first stage assembly 220 is fixed relative to the table top 160 and, as will be discussed below, supports the second stage assembly 224. As best seen in FIGS. 3 and 11, in the illustrated embodiment, the cross member 248 has an L-shaped cross-section of which the uppermost edge or surface 296 is located in the same plane as the workpiece support surface 168. As a result, the uppermost edge or surface 196 can provide additional support to a workpiece resting on the workpiece support surface 168.

The first stage locking mechanism 222 is configured in a locked state to clamp the first stage front and rear rails 240, 244 to the front and rear rail supports 204, 206, respectively.

In the unlocked state, the first stage locking mechanism 222 allows the first stage front and rear rails 240, 244 to move relative to the front and rear rail supports 204, 206 in the direction perpendicular to the cutting plane. The first stage locking mechanism 222 may include, for example, a mechanism similar to the locking mechanism discussed below with reference to FIGS. 21 and 22.

Referring back to FIG. 3, the second stage assembly 224 includes a second stage front rail 320, a second stage rear rail 324, and an extension table 328. The extension table 328 is rigidly connected to the second stage front rail 320 and the second stage rear rail 324 such that the first and second stage rails 320, 324 and the extension table 328 form a rigid assembly. In addition, the extension table 328 has a top surface 330 that is coplanar with the workpiece support surface 168 of the table top 160 so as to provide additional support for the workpiece at a distance from the table top 160.

As illustrated in detail in FIGS. 6-9, the second stage front rail 320 is formed by an exterior rail portion 332, a sidewall 336, and an upper wall 340. The exterior rail portion 332 projects from the sidewall 336 so as to define an upper groove 344 and a lower groove 348, which guide glide members (not shown) and a locking member, for example of the rip fence lock 180, of the rip fence 164 so as to enable the rip fence 164 to slide along the second stage front rail 320. In one embodiment, the rip fence 164 is configured to slide in the upper groove 344 when positioned above the table top 160 for cutting, as illustrated in the views of FIGS. 1-3, and to be positioned in the lower groove 348 when the table saw 100 is stored or moved so as to reduce the overall dimensions of the table saw 100 when stored or moved.

Figure 6:
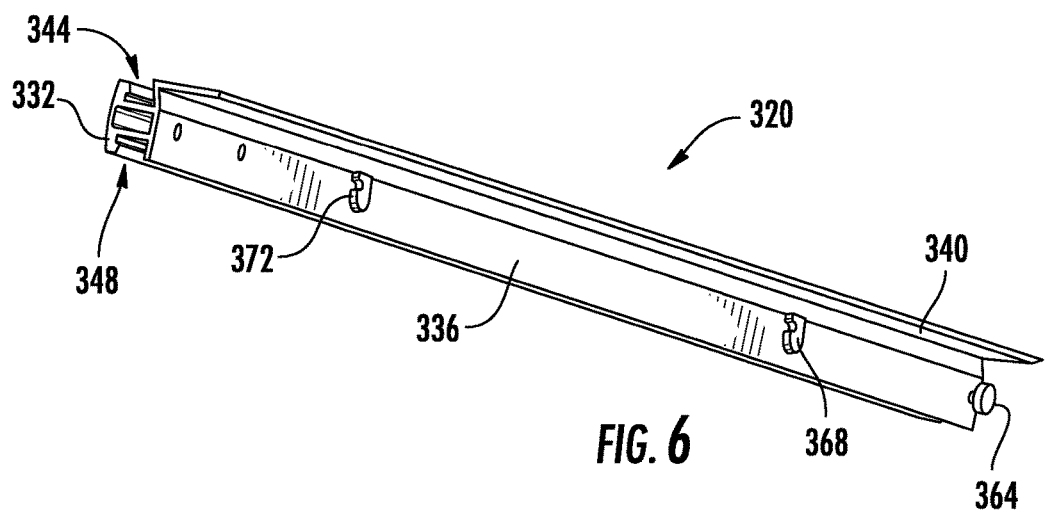
FIG. 6 is a rear perspective view of a front second stage rail of the second stage assembly of the table saw of FIG. 1.
Figure 7:
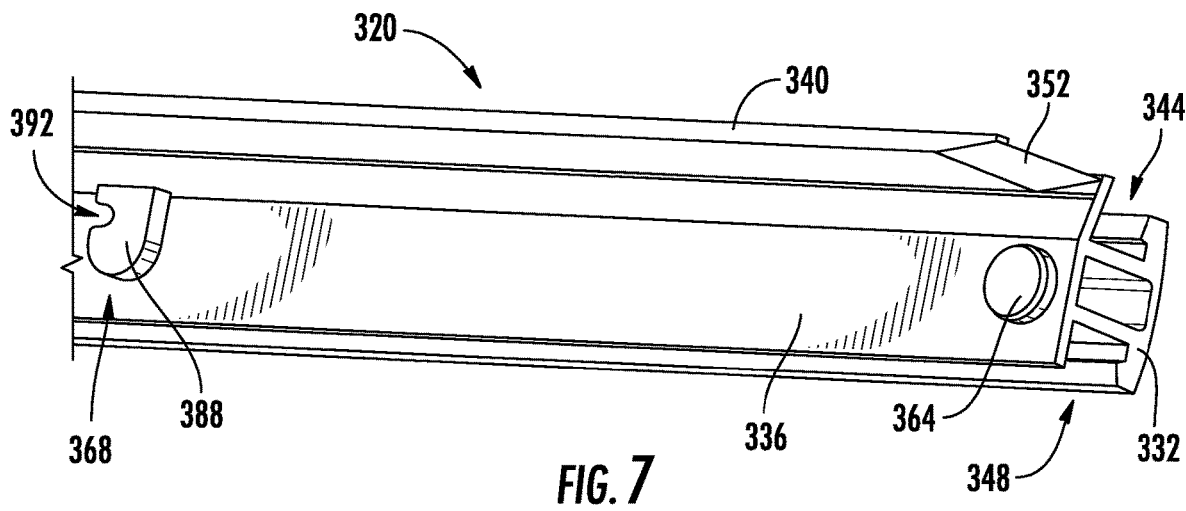
FIG. 7 is a rear detail view of the front second stage rail of FIG. 6.
Figure 8:
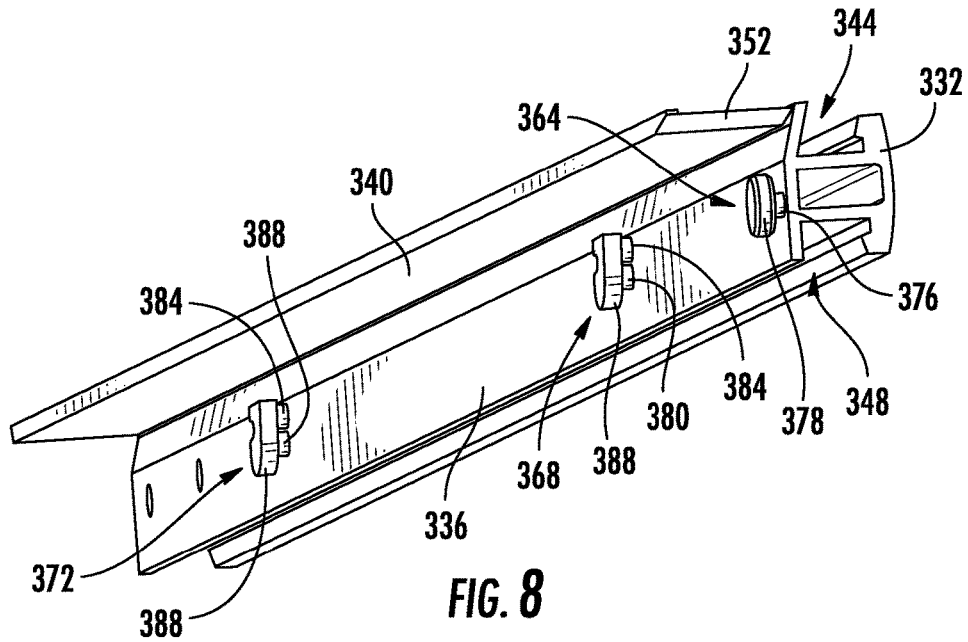
FIG. 8 is a right side perspective view of the front second stage rail of FIG. 6.

At a first end region of the second stage front rail 320, which is at the left side in the view of FIG. 3 and the right side in the views of FIGS. 6-8, the sidewall 340 includes an angled surface 352, which, as will be discussed below, enables the second stage front rail 320 to rotate relative to the first stage front rail 240. The angled surface 352 may be at an angle of between 5 and 25 degrees relative to the lower surface of the upper wall 340. In some embodiments, the angled surface 352 may be at an angle of between 10 and 15 degrees relative to the lower surface of the upper wall 340. The sidewall 336 and the upper wall 340 are generally perpendicular to one another, and define an engagement cavity 360 therebetween in which the first stage front rail 240 can engage the second stage front rail 320.

Continuing with FIGS. 6-9, a guide boss 364, a first latch boss 368, and a second latch boss 372 extend from the sidewall 336 into the engagement cavity 360. The guide boss 364 includes a shaft portion 376, which is connected to the sidewall 336, and a guide boss body portion 378, which has an increased size relative to the shaft portion 376. The guide boss body portion 380 is generally circular in cross-section, and has a diameter that is slightly less than the height of the internal channel portion 280 (FIG. 4) of the first stage front rail 240 such that the guide boss body portion 380 fits tightly into the internal channel portion 280. In some embodiments, the guide boss body portion 380 may be oval-shaped. The shaft portion 376 is generally circular, and has a diameter that corresponds approximately to the height of the slot 284 of the first stage front rail 240 (FIGS. 4 and 5).

The first and second latch bosses 368, 372 are separated from one another by the same distance as the first and second notches 288, 292 of the first stage rails 240, 244. Each of the first and second latch bosses 368, 372 includes two shaft portions 380, 384 and a latch boss body portion 388. The latch boss body portions 388 each have a width at the widest section that is slightly less than a width of the notches 288, 292 of the first stage rail 240 (FIG. 10). The width of the latch body portions 388 tapers from the width of the notches to a reduced width at the lowest portion of the latch body portions 388. In the embodiment illustrated in FIGS. 6-10 and 14, the tapered portion is rounded, though in other embodiments, the taper may be linear or V-shaped (see, e.g., FIG. 12). Each of the latch boss body portions 388 defines a locking recess 392 which, as discussed in detail below, engages the second stage locking mechanism 228 to lock the second stage assembly 224 relative to the first stage assembly 220.

Figure 9:
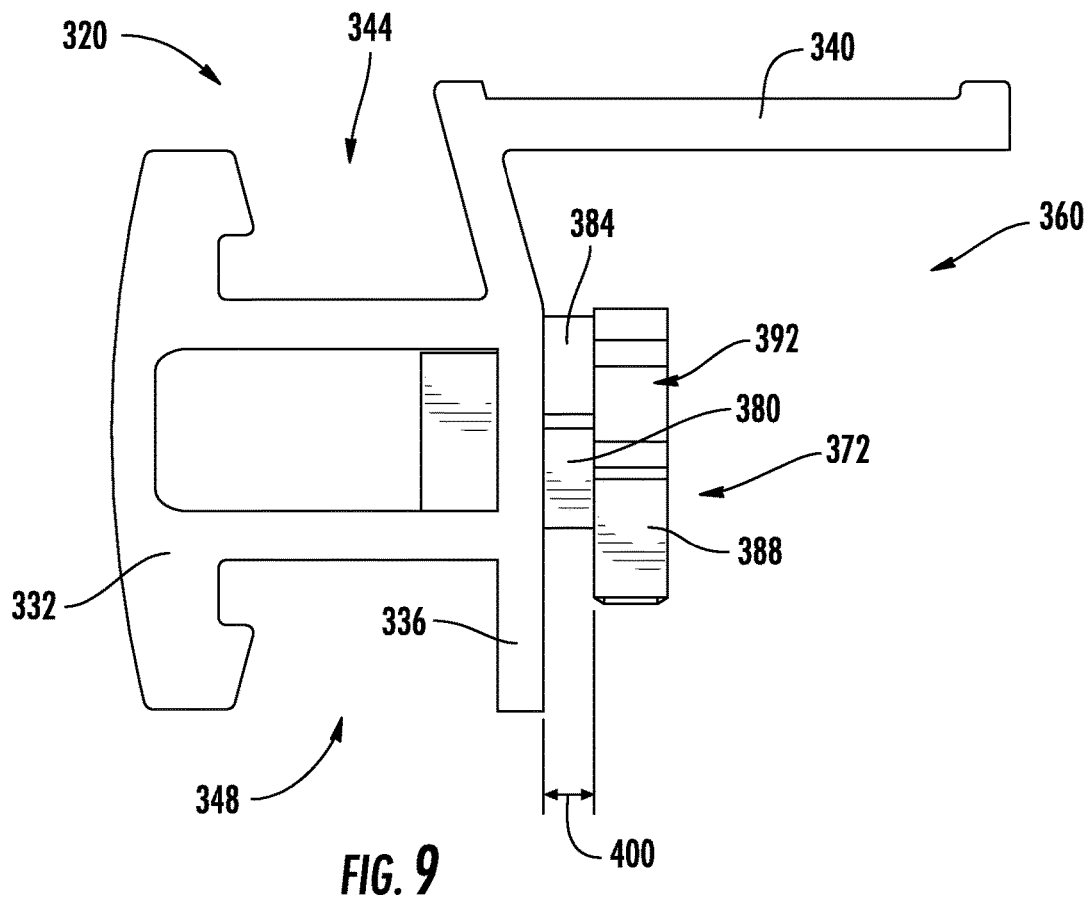
FIG. 9 is a right side view of the front second stage rail of FIG. 6.
Figure 10:
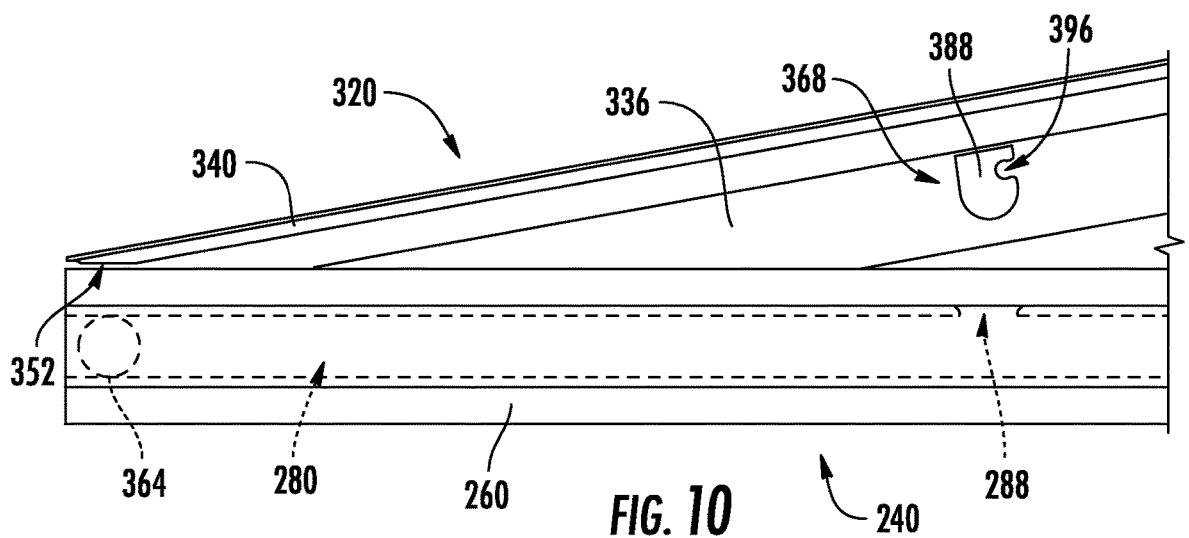
FIG. 10 is a rear elevation view of the front first stage rail of FIG. 4 and the front second stage rail of FIG. 6 in an unlocked position, with the internal channel of the front first stage rail and the guide boss of the front second stage rail shown in shadow.

Referring now to FIG. 9, each of the shaft portions 376, 380, 384 has approximately equal depth dimensions, such that the latch body portions 388 and the guide boss body portion 378 are all spaced apart from the sidewall 336 by approximately the same distance 400. The distance 400 is slightly greater than the thickness of the exterior portion 272 of the first stage front rail 240, and the thickness of the guide and latch boss body portions 378, 388 is slightly less than the depth of the internal channel portion 280 of the first stage front rail 240 such that the guide and latch boss body portions 378, 388 can be positioned within internal channel portion 280, with the shaft portions 376, 380, 384 extending through the slot 284, with little or no play.

The shaft portions 376, 380, 384 may be, for example, rigid shafts formed with or connected to the sidewall 336 and/or the associated boss body portion 378, 388, pins that connect to the associated boss body portion 378, 388, shoulder screws fastened to the associated boss body portion 378, 388, or another suitable connection structure. In addition, while the illustrated embodiment includes two shaft portions 380, 384 connected to the latch boss body portions 378, 388, the reader should appreciate that a single shaft portion having an elongated oval shape, a rectangular shape, a D-shape, a DD-shape, or another suitable shape can be used instead.

The second stage rear rail 324 is configured similarly to the second stage front rail 320. The side and top walls, as well as the latch bosses and guide boss, of the second stage rear rail 324 are substantially identical to the second stage front rail 320, except mirrored about a vertical plane that runs lengthwise along the second stage front rail 320. As a result, the exterior rail portion of the second stage rear rail 324 faces away from the table top 160, while the sidewall and upper wall face toward the table top 160. In some embodiments, the extruded portion and the grooves defined therein may be different in the second stage rear rail 324 than in the second stage front rail 320, depending on the attachment mechanism of the rip fence 164.

Figure 12:
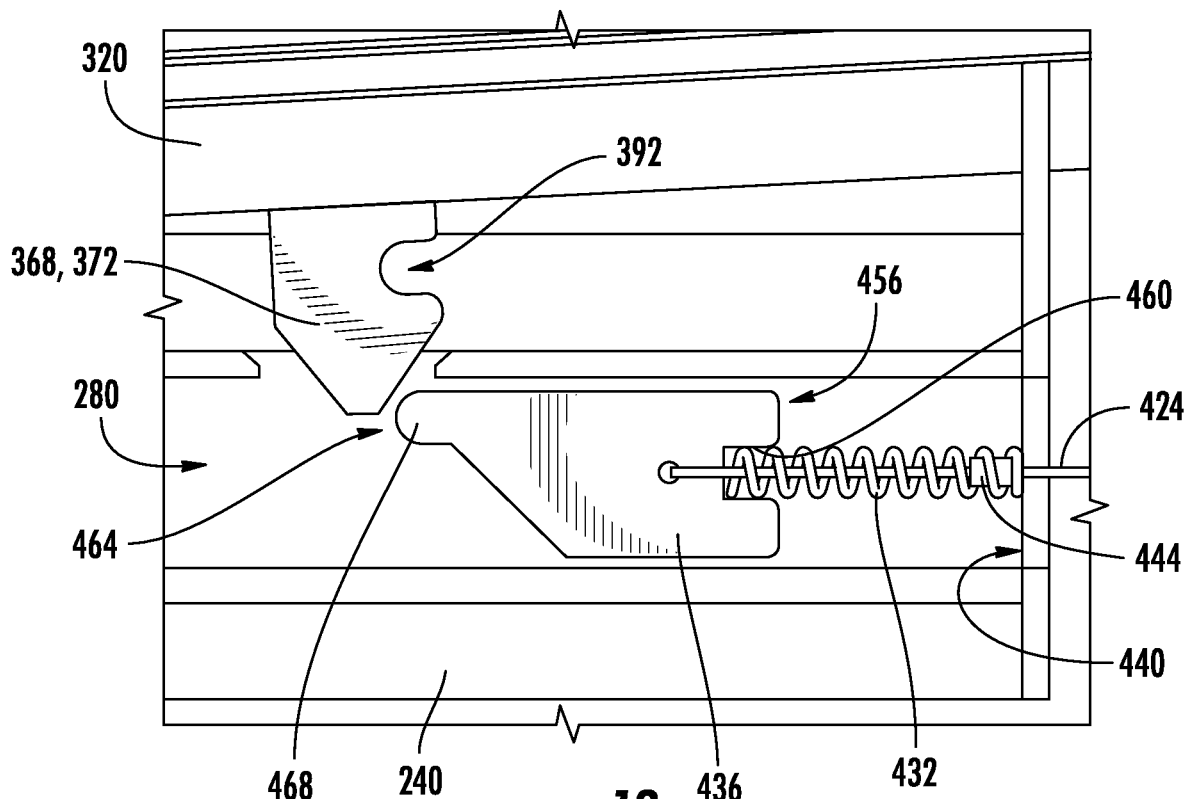
FIG. 12 is a detail side elevation view of the second stage locking mechanism of FIG. 11 in an unlocked position.
Figure 13:
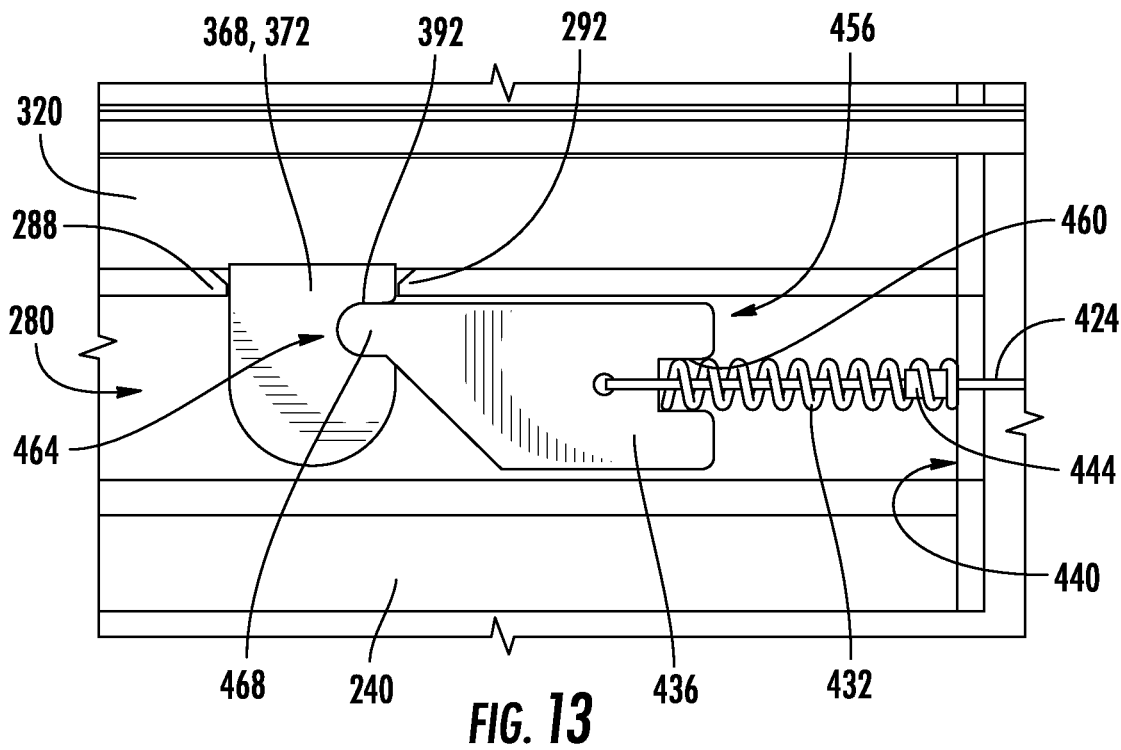
FIG. 13 is a detail side elevation view of the second stage locking mechanism of FIG. 11 in a locked position.

FIGS. 11-13 illustrate the second stage locking mechanism 228, which is configured to lock the second stage rails 320, 324 against movement relative to the first stage rails 240, 244. The second stage locking mechanism 228 includes a lock actuator 420, two cable portions 424, two lock wheels or pulleys 428, two springs 432, and two lock members 436. The lock actuator 420 may be, for example, a lever or a knob that, when turned in a first direction, for example clockwise in FIG. 11, causes the cables 424 to wrap around a portion of the lock actuator 420, thereby pulling the cables 424. When turned in the opposite direction, for example counterclockwise in FIG. 11, the cables 424 unwrap from the lock actuator 420. In one embodiment, the lock actuator 420 is attached to the underside of the cross member 248, though in other embodiments the lock actuator 420 is positioned in another desired location.

The configuration of the front and rear assemblies of the cables 424, wheels or pulleys 428, springs 432, and lock members 436 are substantially identical. For brevity only the front cables 424, wheels or pulleys 428, springs 432, and lock members 436 will be described, with the understanding that the rear cables 424, wheels or pulleys 428, springs 432, and lock members 436 are substantially identical both structurally and functionally. The reader should also appreciate that, while the illustrated embodiment includes both front and rear cables, wheels or pulleys, springs, and lock members, in some embodiments the second stage locking mechanism may include only the front or only the rear cables, wheels or pulleys, springs, and lock members.

The cable 424 partially wraps around the wheel or pulley 428 such that a portion of the cable 424 runs in the internal channel portion 280 of the external C-shaped channel 276 of the first stage front rail 240. As is best seen in FIGS. 12 and 13, the cable 424 extends through the center of the spring 432 and connects to the locking member 436 in such a way that pulling the cable 424 causes a pulling force on the locking member 436.

The spring 424 is interposed between a support surface 440 of the first stage front rail 240, which may be at the end of the internal channel portion 280 adjacent to the second notch 292, and the lock member 436. A first end of the spring 424 at the support surface 440 may be wrapped around a spring guide 444 that is rigidly attached to the support surface 440 to prevent transverse movement of the first end of the spring 424.

A first end 456 of the lock member 436 defines a spring well 460 that receives the second end of the spring 424 to disable the second end of the spring 424 from moving transversely. The first end 456 of the lock member 436 has a height and a depth that are slightly less than the height and depth, respectively, of the internal channel portion 280 of the first stage front rail 240 such that the locking member 436 can slide in the internal channel portion 280 without pivoting within the internal channel portion 280.

The second end 464 of the locking member 436 includes a protrusion 468 that has dimensions that are approximately equal to the locking recess 392 of the latch bosses 368, 372 such that the protrusion 468 can be received complementarily in the locking recesses 392 (FIG. 13).

FIG. 1 illustrates the table saw 100 with the extension assembly 200 in a base state in which both the first and second stage assemblies 220, 224 are in their respective retracted states. In the base state, the second stage rails 320, 324, first stage rails 240, 244, and rail supports 204 are fully overlap with one another such that the table saw 100 has the smallest width dimension. In addition, the extension table 328 is positioned above the lower wall of the L-shaped cross-section of the cross member 248 so as to further reduce the length of the table saw 100. The rip fence 164 can be moved by disengaging the rip fence lock 180 and sliding the rip fence 164 along the groove 344 in the second stage rails 320, 324 to position the rip fence 164 for any rip cut of a width less than the distance between the saw blade 144 and the rip fence 164 at the rightmost portion of the second stage rails 320, 324.

Figure 14:
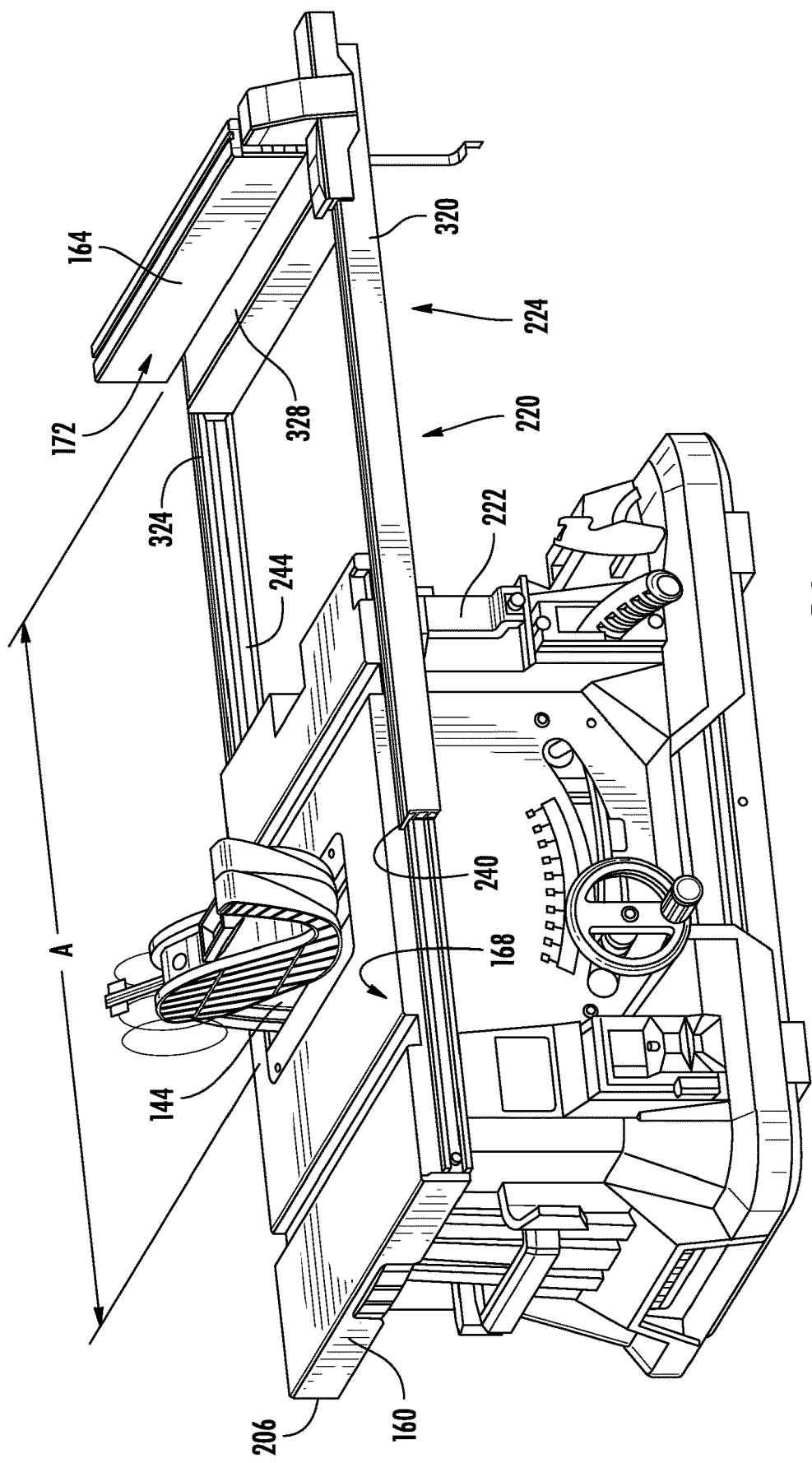
FIG. 14 is a left side perspective view of the table saw of FIG. 1 in which the first stage assembly is extended and the second stage assembly is retracted.
Figure 15:
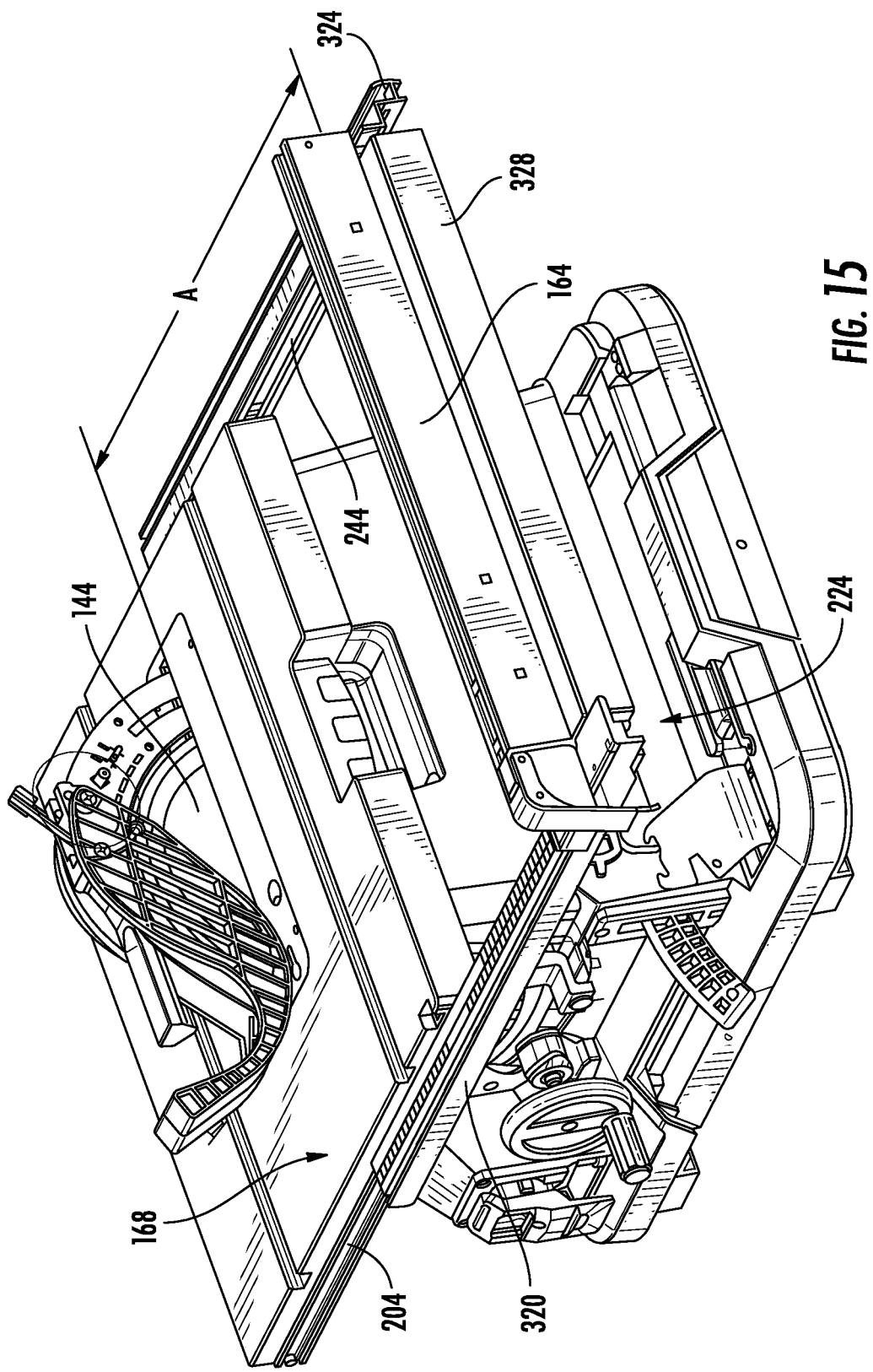
FIG. 15 is a right side perspective view of the table saw of FIG. 1 in which the first stage assembly is extended and the second stage assembly is retracted.

For a rip cut having a greater width, the user extends the extension assembly 200. The user first unlocks the first stage locking mechanism 222 to decouple the first stage rails 240, 244 from the rail support 204. The first stage rails 240, 244 can then be moved left or right to position the rip fence 164 at the position for the desired cut. FIGS. 2, 14, and 15 illustrate the first stage assembly 220 at the maximum first stage extension, whereat the distance between the saw blade 144 and the rip fence guide surface 172 is denoted as A. The first stage locking mechanism 222 can be locked at any desired position to enable a cut having a width up to A.

If, however, a rip cut having a width greater than A is desired, the second stage assembly 300 must be extended. To extend the second stage assembly 300, the user actuates the lock actuator 420, which pulls the cables 424 around the wheels or pulleys 428 (FIG. 11). The cables 424 pull the locking members 436, which are in the locked position of FIG. 13, in the internal channel portion 280 against the force of the springs 432, compressing the springs 432 and moving the locking members 436 to the right in the view of FIG. 13. The protrusions 468 of the locking member 436 move out of the latching recesses 396 of the second latching boss 372, thereby unlocking upward movement of the second latching boss 372 relative to the second notch 292.

Figure 16:
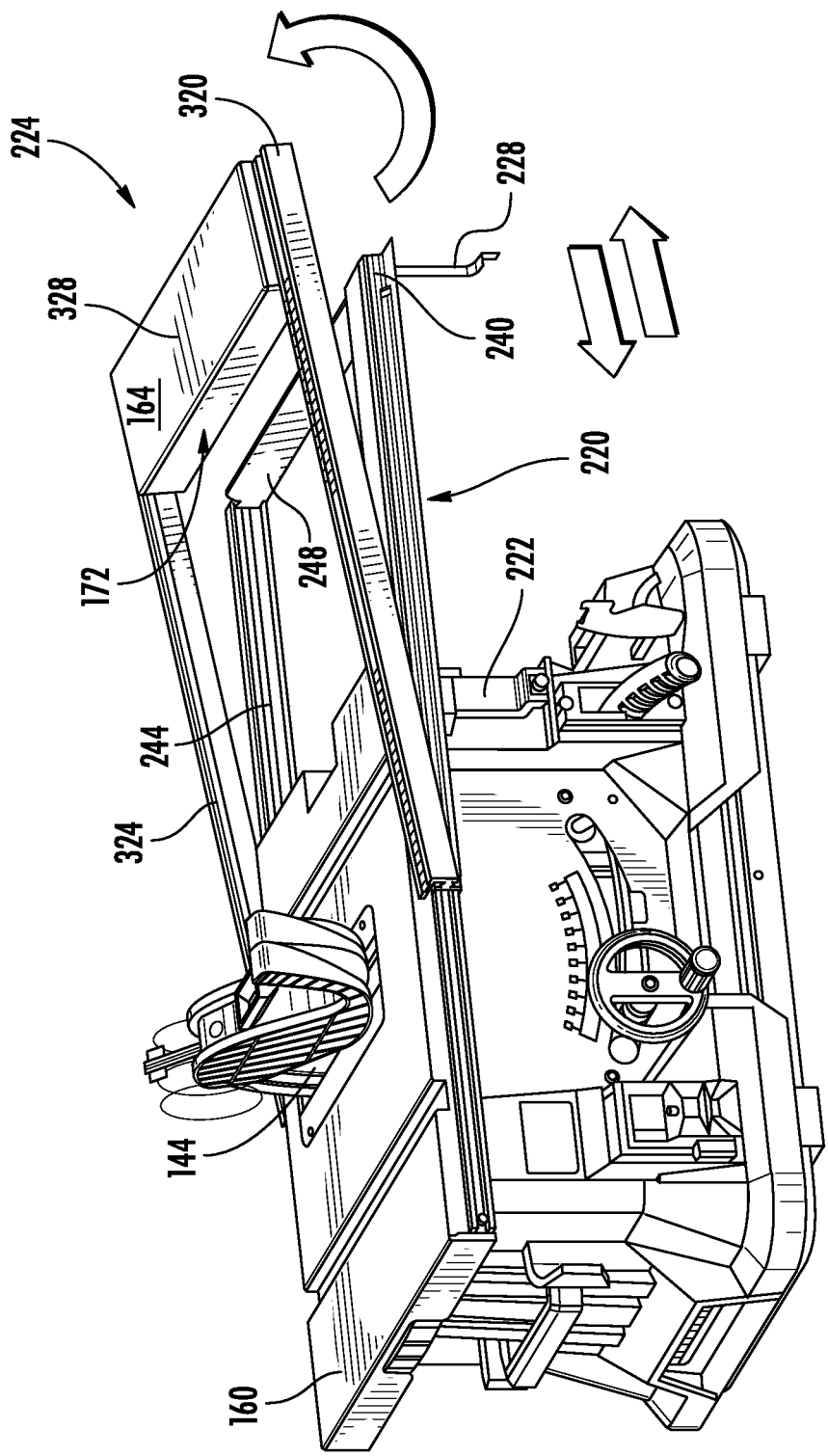
FIG. 16 is a left side perspective view of the table saw of FIG. 1 with the second stage assembly in a retracted and unlocked position.

As illustrated in FIG. 16, the user then lifts upwardly on the end of the second stage assembly 300 remote from the table top 160. The guide bosses 364 are fixed vertically relative to the first stage rails 240, 244 since there is no gap in the external portion 272 of the first stage rails 240, 244 adjacent to the guide bosses 364 (see FIG. 10). The bodies 388 of the first and second latch bosses 368, 372 (FIGS. 6-8 and 12-13), however, move upwardly relative to the first stage rails 240, 244 and through the upper opening of the respective first and second notches 288, 292 (FIGS. 4, 5, and 12-13). The second stage assembly 240 therefore pivots about the guide bosses 364, as seen in FIGS. 10 and 16.

Figure 17:
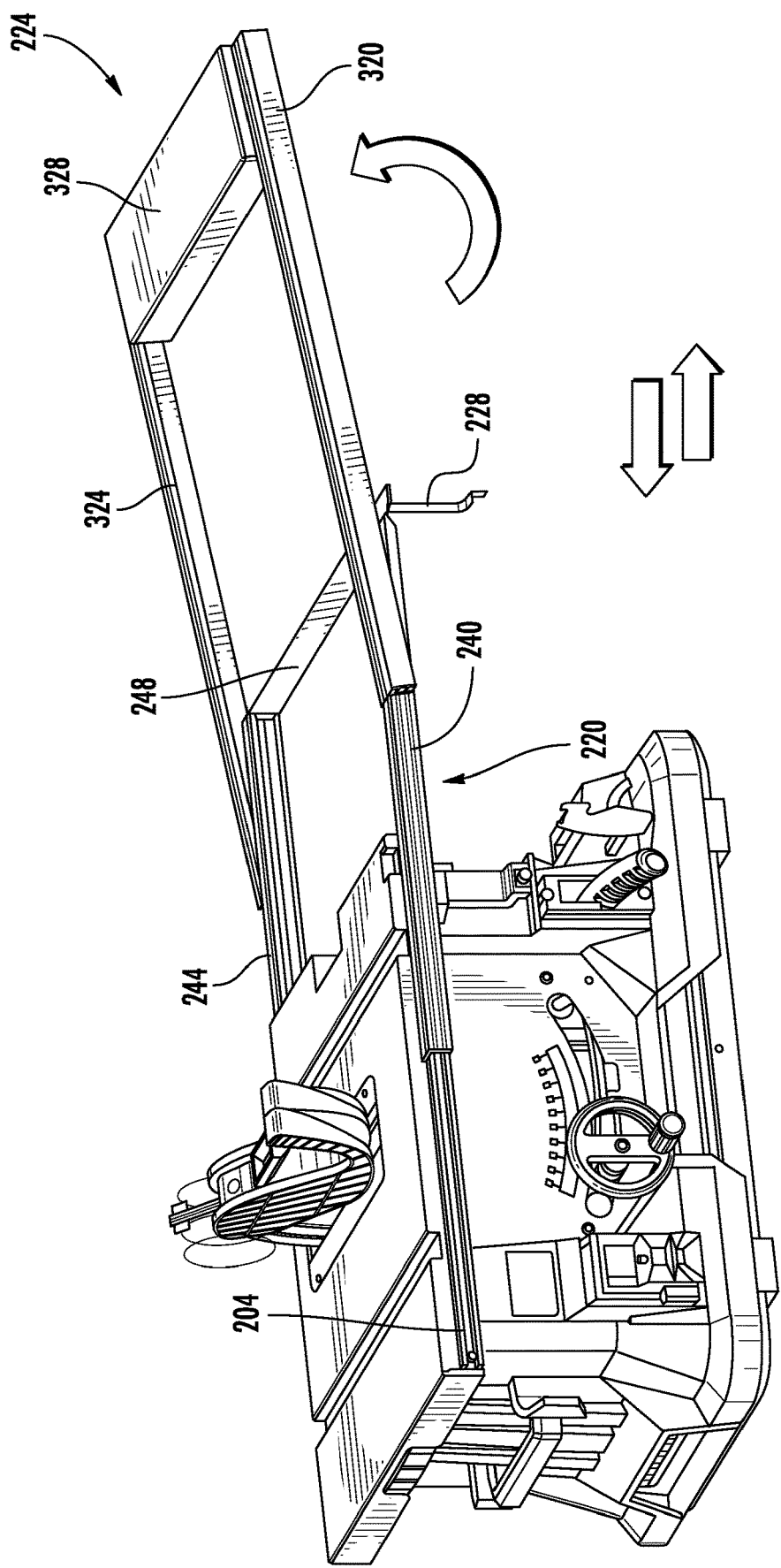
FIG. 17 is a front perspective view of the table saw of FIG. 1 with the second stage assembly in an extended and unlocked position.
Figure 18:
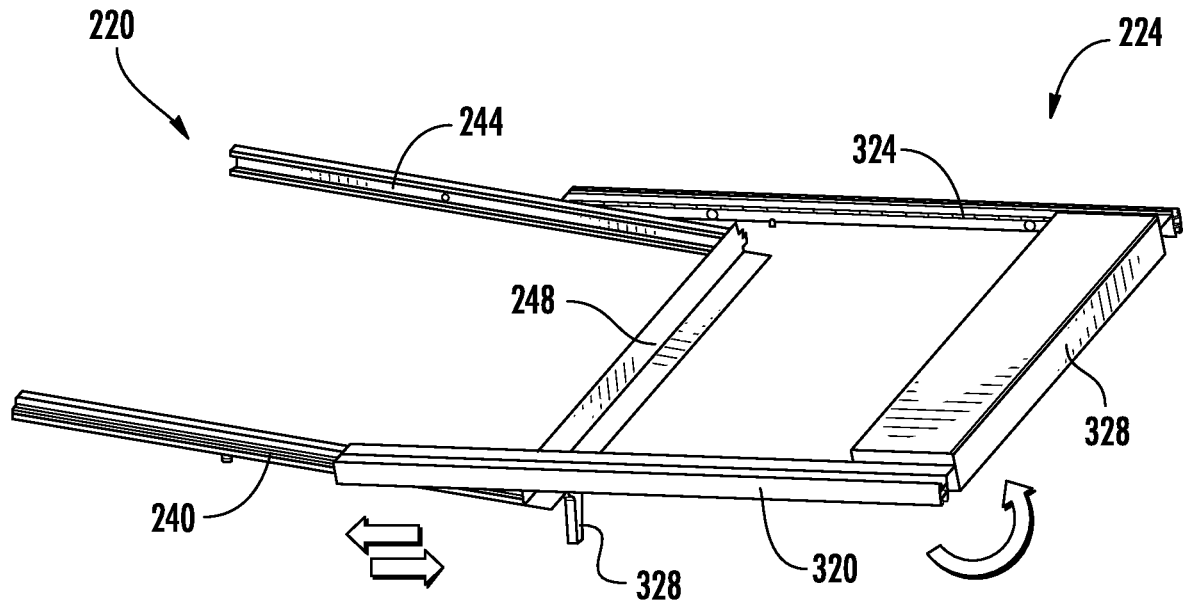
FIG. 18 is a front perspective view of the first and second stage assemblies of the table saw of FIG. 1 in which the second stage assembly is in an extended and unlocked position.

Once the second stage assembly 240 has pivoted to the extent that the latch bosses 368, 372 are clear of the external portion 272 of the first stage rails 240, 244, the second stage assembly 224 can be moved to the right (as viewed from the front of the saw) to the position of FIGS. 17 and 18. When the first latch bosses 368 of the second stage rails 320, 324 are aligned with the respective second notches 292 of the first stage rails 240, 244, the end of the second stage assembly 224 is lowered so that the body 388 of the first latch bosses 368 pass through the associated second notch 292 and into the internal channel portions 280 of the first stage rails 240, 244.

If the second stage locking mechanism 228 is in the locked state, as the first latch bosses 368 are lowered into the second notches 292, the tapered lower portion of the bodies 388 of the first latch bosses 368 contact the protrusions 468 of the lock members 436 (FIG. 12). The tapered surfaces urge the protrusions 468 to the right in the view of FIG. 12, allowing the bodies 388 of the first latch bosses 368 to pass into the internal channel portions 280 of the first stage rails 240, 244. When bodies 388 of the first latch bosses 368 have moved into the internal channel portions 280, the protrusions 448 align with the locking recesses 392 of the first latch bosses 368. Thus, the second stage locking mechanism 228 allows for the second stage assembly 224 to be pivoted into the retracted or extended state even when the second stage locking mechanism 228 is already in the locked position.

Figure 19:
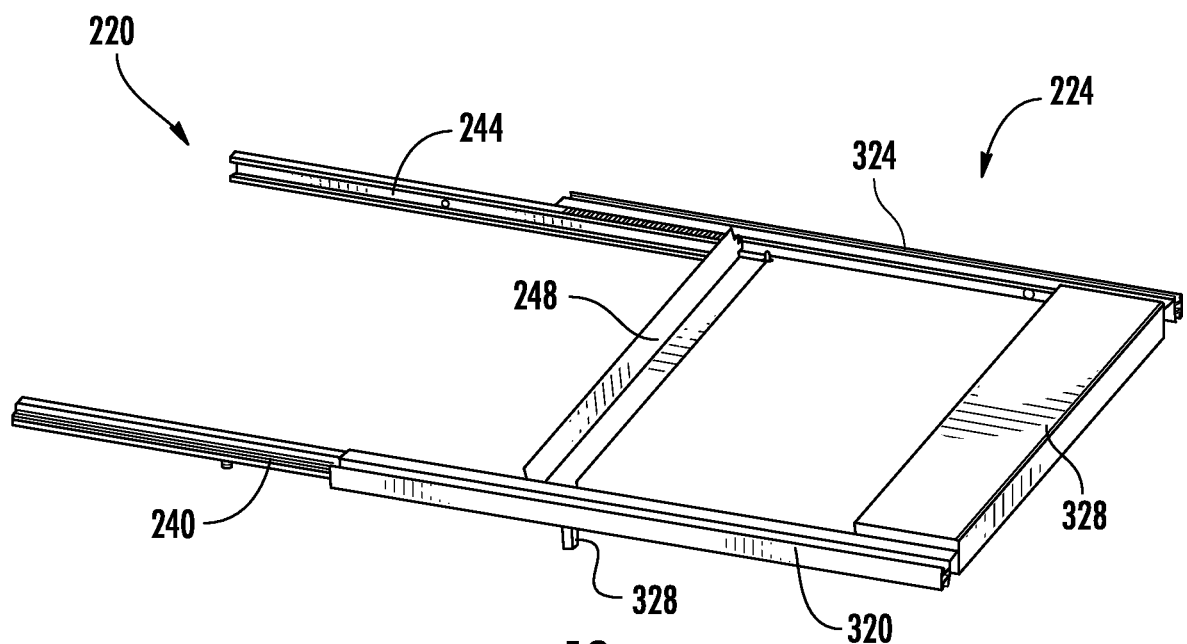
FIG. 19 is a front perspective view of the first and second stage assemblies of the table saw of FIG. 1 in which the second stage assembly is in an extended and locked position.
Figure 20:
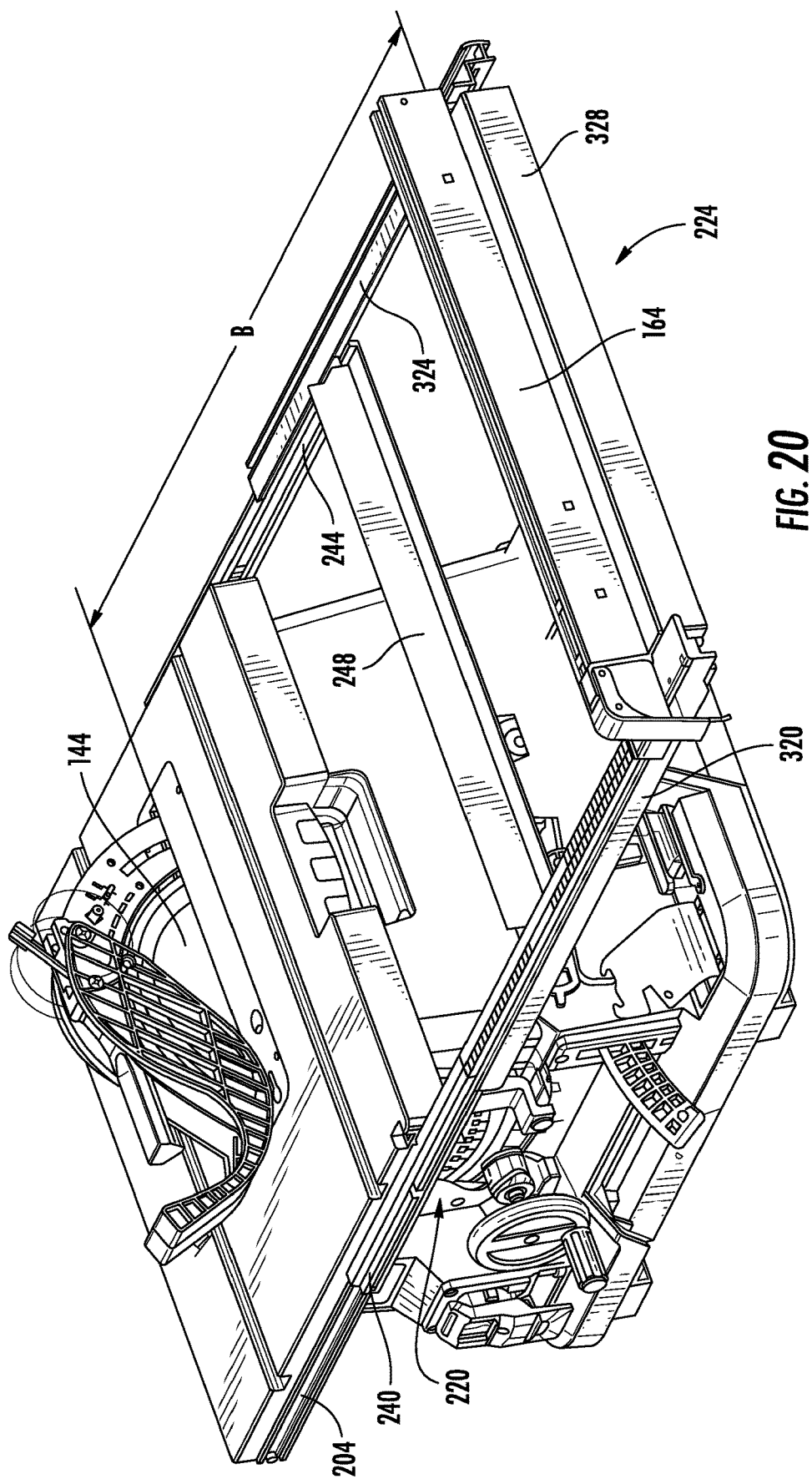
FIG. 20 is a right side perspective view of the table saw of FIG. 1 in which the second stage assembly is in an extended and locked position.

The springs 432 urge the locking members 436 such that the protrusions 464 move into the locking recesses 392, thereby moving the locking members 436 to the locked position shown in FIG. 13, which prevents the first latch bosses 368, and therefore the second stage rails 320, 324, from moving vertically relative to the first stage rails 240, 244. Moreover, the side surfaces of the first latch bosses 368 engage outside of the second notches 292, thereby preventing sliding movement of the second stage rails 320, 324 relative to the first stage rails 240, 244. The second stage assembly 224 is therefore locked in the extended position shown in FIGS. 3, 19, and 20.

As a result, when the second stage assembly 224 is extended, the table saw 100 can perform rip cuts up to a width B (FIGS. 3 and 20) by moving the rip fence 164 along the second stage rails 320, 324. As is evident comparing FIGS. 2 and 3, the distance B is greater than the distance A by a substantial amount. In one embodiment, the distance A is about 22 inches, while the distance B is about 36 inches. In other embodiments, the distance B is approximately 50% to approximately 70% greater than the distance A.

To return the table extension system 200 to the retracted state, the user first actuates the lock actuator 420 of the second stage locking mechanism 228 so that the protrusions 468 of the lock members 436 are pulled out of the locking recesses 392 (FIGS. 11 and 13), thereby unlocking the second stage locking mechanism 228. The user then lifts upwardly on the end of the rigid second stage assembly 224 at the extension table 328. Since the protrusions 468 of the lock members 436 are disengaged from the locking recesses 392 of the second latching bosses 372, the second latching bosses 372 move upwardly and pass through the first notch 288 of the first stage front and rear rails 240, 244, as seen in FIG. 12, and the second stage front and rear rails 320, 324 both pivot about their respective guide bosses 364 to the position of FIGS. 17 and 18.

The user then slides the rigid second stage assembly 224 to the left in the view of FIGS. 17 and 18. The guide bosses 364 of the second stage rails 320, 324 move within the internal channel portion 280 of the first stage rails 240, 244, thereby allowing the second stage assembly 224 to move laterally to the left, while disabling movement toward the front or rear of the table saw 100.

Once the second stage assembly 224 has reached the position of FIG. 16, at which the extension table 328 is above to the cross member 248, the first and second latch bosses 368 372 are aligned with the respective first and second notches 288, 292 (FIGS. 10 and 12). The user can then lower the extension table end of the second stage assembly 224 such that the first and second latch bosses 368, 372 pass through the respective first and second notches 288, 292, and into the internal channel portions 280. The protrusions 468 of the locking members 436 engage the locking recesses 392 of the second latch bosses 372 (FIG. 13), either in response to the user actuating the locking actuator 420 or via the tapered lower surfaces of the second latch bosses 372 moving the locking members 436 and the springs 432 pushing the locking members 463 such that the protrusions 468 move into the locking recesses 392.

At this point, the second stage assembly 224 is in a retracted position, while the first stage assembly 220 remains in an extended position, as illustrated in FIGS. 2, 14, and 15. The second stage assembly 224 is also locked so as to be fixed relative to the first stage assembly 220 by the second stage locking mechanism 228. The user can then actuate the first stage locking mechanism 222 to unlock the first stage assembly 220 from the support rails 204. Since the second stage assembly 224 is fixed relative to the first stage assembly 220, both the first and second stage assemblies 220, 224 can move laterally relative to the table top 160. The user then slides the first and second stage assemblies 220, 224 to the left until the first stage assembly 224 is in the retracted position shown in FIG. 1, at which point the user can lock the first stage locking mechanism 222 to fix the first stage assembly 224 relative to the table top 160.

With both the first and second stage locking mechanisms 222, 228 locked, and the first and second stage assemblies 220, 224 in their respective retracted positions of FIG. 1, the table saw 100 has a reduced footprint. As a result, the table saw 100 can be easily transported from one location to another location. Moreover, the first and second stage assemblies 220, 224 are always attached to the table top 160, and the components of the first and second stage assemblies 220, 224 cannot therefore be lost or misplaced from the remainder of the table saw 100 during transport or storage.

In addition, while the table saw 100 has a reduced footprint for transport, the two stage extension system 200 enables the user to expand the support for the table saw 100 laterally outwardly from the table top 160. As a result, the width of rip cuts that can be performed by the table saw 100 is significantly greater than conventional table saws.

Figure 21:
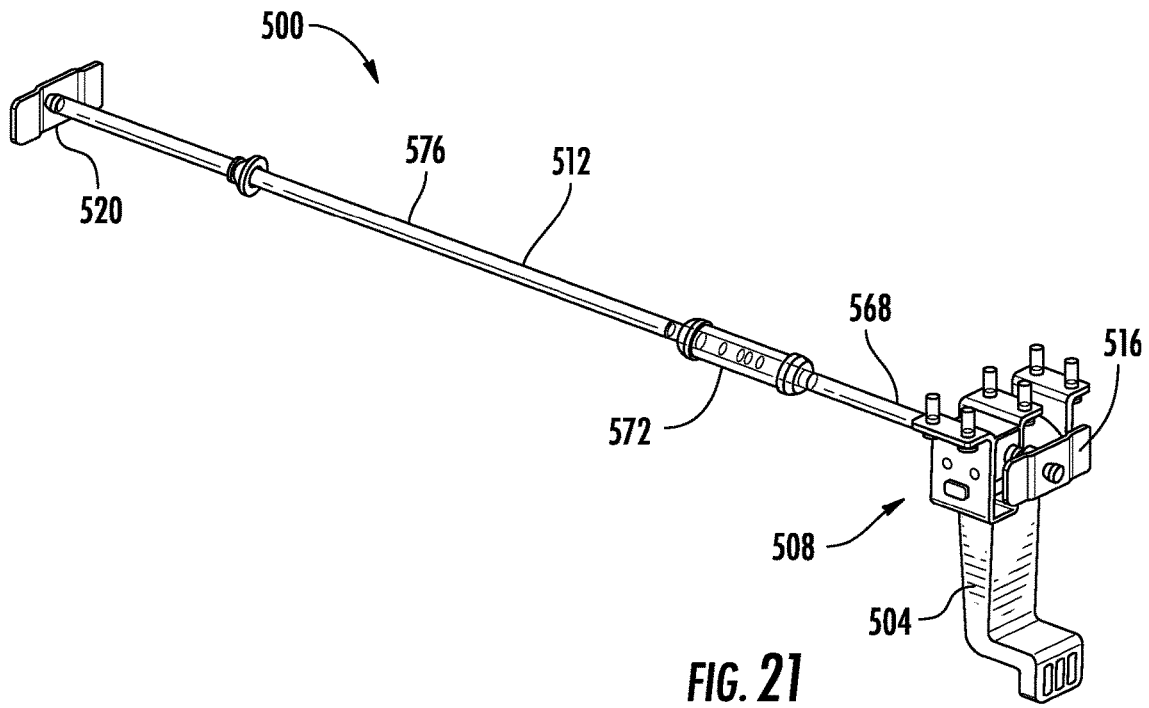
FIG. 21 is a front perspective view of another second stage locking mechanism for the table saw of FIG. 1.
Figure 22:
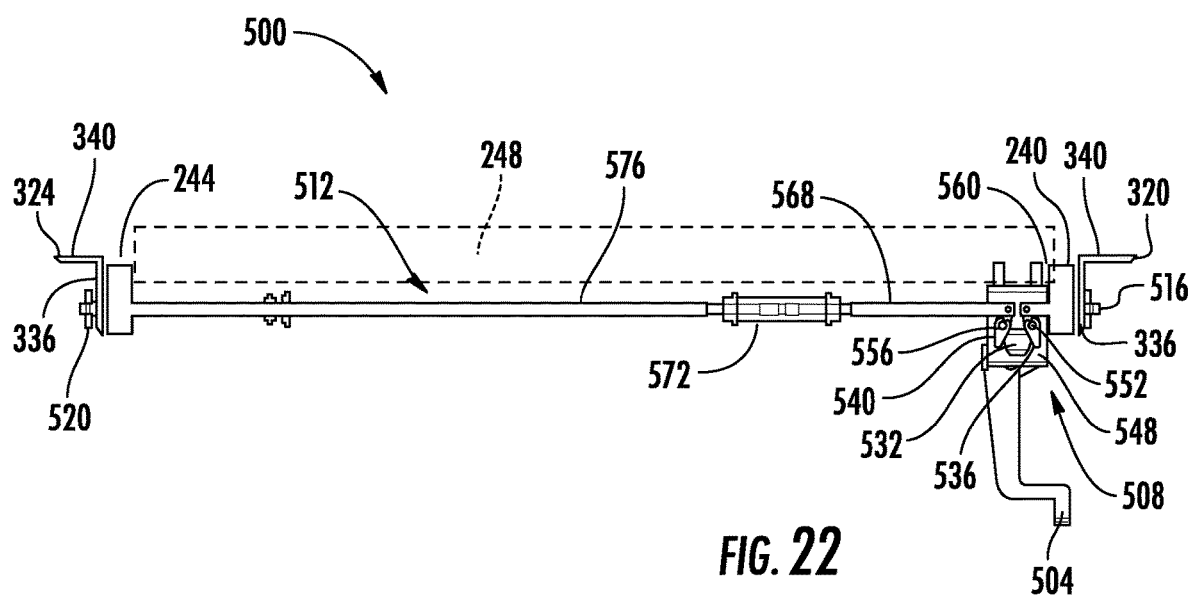
FIG. 22 is a side elevation view of the second stage locking mechanism of FIG. 21.

FIGS. 21 and 22 illustrate a second embodiment of a second stage locking mechanism 500 that can be used in the table saw 100 in place of the second stage locking mechanism 228. The second stage locking mechanism 500 includes a lock actuator 504, a cam assembly 508, a connecting rod assembly 512, and front and rear fixing plates 516, 520.

The cam assembly 508 includes a cam member 532 that is rigidly connected to the handle 504. The cam member 532 abuts front and rear lever members 536, 540, which are connected to a fixed body 548 of the cam assembly 508 by, for example, pin connections 552, 556.

The connecting rod assembly 512 includes a front rod portion 560 connected at a first end to the front lever member 536 and at the opposite end to the front fixing plate 516. The connecting rod assembly 512 further includes a first rear rod 568 connected to the rear lever member 540, an adjustment nut 572 connected to the first rear rod 568, and a second rear rod 576 connected to the adjustment nut 572 and the rear fixing plate 520.

The lock actuator 504 is configured to be actuated by a user by pivoting from the locked position shown in FIG. 22 counter-clockwise about the central axis of the cam member 536. The cam member 536 rotates such that the lever members 536, 540 engage the sides of the cam member that are close to one another, thereby enabling the lever members 536, 540 to pivot clockwise and counter-clockwise, respectively, as seen in the view of FIG. 22, to about the pins 552, 556.

The pivoting of the lever members 536, 540 is transmitted via the connecting rod assembly 512 to the fixing plates 516, 520. The fixing plates 516, 520 are flexible or elastic members, and the pivoting of the lever members 536, 540 thus enables the fixing plates 516, 520 to release from clamping the side walls 336 of the front and rear second stage rails 320, 324 to the front and rear first stage rails 240, 244. The second stage rails 320, 324 are then movable relative to the first stage rails 240, 244.

To lock the second stage locking mechanism 500, the user rotates the actuator 504 clockwise back towards the position shown in FIG. 22. The cam member 532 rotates such that the sides that are spaced apart from one another by a greater distance move into engagement with the lever members 536, 540. The lever members 536, 540 are forced to pivot counter-clockwise and clockwise, respectively, which pulls the front connecting rod 560 to the left in the view of FIG. 22, and the rear connecting rods 568, 572 to the right. As a result, the fixing plates 516, 520 are pulled into engagement with the side walls 336 of the second stage rails 320, 324, which clamps the second stage rails 320, 324 against the first stage rails 240, 244 and locks the second stage rails 320, 324 against movement relative to the first stage rails 240, 244.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A table saw comprising:
a base assembly;
a saw assembly supported by the base assembly, the saw assembly including a saw; and
a table assembly supported by the base assembly, the table assembly comprising:
   a table top defining an opening through which the saw extends;
   a table extension system comprising:
      a first stage assembly supported by the table top and movable as a unit relative to the table top between a first stage retracted position and a first stage extended position; and
      a second stage assembly supported by the first stage assembly and movable as a unit relative to the first stage assembly between a second stage retracted position and a second stage extended position; and
   a rip fence supported by and movable relative to the second stage assembly,
wherein:
   the saw defines a cutting plane;
   the first stage assembly is movable relative to the table top in a first direction perpendicular to the cutting plane; and
   the second stage assembly is movable relative to the first stage assembly in the first direction the table assembly further comprises two rail supports supported on opposite sides of the table top; and
   the first stage assembly comprises two first stage rails, each of which is supported by a respective one of the two rail supports and is configured to be movable relative to the two rail supports in the first direction.

2. The table saw of claim 1, the second stage assembly comprising:
two second stage rails, each of which is supported by a respective one of the two first stage rails and is configured to be movable relative to the respective one of the two first stage rails in the first direction, the rip fence being supported by the two second stage rails.

3. The table saw of claim 2, the table extension system further comprising:
a second stage lock mechanism having a locked state in which the second stage assembly is fixed relative to the first stage assembly and an unlocked state in which the second stage assembly is movable relative to the first stage assembly in the first direction.

4. The table saw of claim 3, wherein:
at least one second stage rail of the two second stage rails comprises a side wall, a first boss extending from the side wall, and a second boss extending from the side wall; and
the second stage lock mechanism includes a locking member configured to interact with the first boss to lock the second stage assembly in the second stage extended position and to interact with the second boss to lock the second stage assembly in the second stage retracted position.

5. The table saw of claim 4, wherein:
at least one first stage rail of the two first stage rails includes a first portion that defines an interior channel extending along a longitudinal length of the at least one first stage rail; and
the at least one second stage rail further comprises a guide boss extending from the side wall and which is positioned in the interior channel, the guide boss being movable within the interior channel in the first direction and the at least one second stage rail being pivotable about the guide boss when the second stage lock mechanism is unlocked.

6. The table saw of claim 5, wherein:
the first portion of the at least one first stage rail defines a first notch that opens into the interior channel and a second notch that opens into the interior channel;
the first boss is configured be positioned in the second notch so as to interact with the first portion of the at least one first stage rail to disable movement of the second stage assembly in the first direction when the second stage assembly is in the second stage extended position; and
the first boss is configured to be positioned in the first notch and the second boss is configured to be positioned in the second notch such that the first and second bosses interact with the first portion of the at least one first stage rail to disable movement of the second stage assembly in the first direction when the second stage assembly is in the second stage retracted position.

7. The table saw of claim 6, wherein, when the second stage lock mechanism is unlocked, the at second stage assembly is pivotable relative to the first stage assembly about the guide boss from a first position, in which at least one of the first and second bosses is in at least one of the first and second notches, to a second position, in which the first and second notches are not in either of the first and second notches and the second stage assembly is movable in the first direction between the second stage retracted and second stage extended positions.

8. The table saw of claim 2, wherein:
the first stage assembly further comprises a cross member connecting the two first stage rails to one another in such a way that the two first stage rails and the cross member move together as a first rigid assembly; and
the second stage assembly further comprises an extension table connecting the two second stages to one another in such a way that the two second stage rails and the extension table move together as a second rigid assembly.

9. The table saw of claim 8, wherein:
the table top includes a workpiece support surface that defines a first plane;
the extension table includes a planar surface that is coplanar with the first plane; and
the cross member has an L-shaped cross-section, and an uppermost edge of the L-shaped cross-section is in the first plane.

10. The table saw of claim 9, wherein, in the second stage retracted position, a portion of the extension table is directly above a portion of the cross member.

11. A table extension system for a table saw, comprising:
a first stage assembly configured to be supported by a table top of the table saw, the first stage assembly movable as a unit relative to the table top between a first stage retracted position and a first stage extended position; and a second stage assembly supported by the first stage assembly and movable as a unit relative to the first stage assembly between a second stage retracted position and a second stage extended position, the second stage assembly configured to support a rip fence of the table saw in such a way that the rip fence is movable relative to the second stage assembly, wherein:

the first stage assembly is movable relative to the table top in a first direction perpendicular to a cutting plane defined by a saw of the table saw;

the second stage assembly is movable relative to the first stage assembly in the first direction; and the first stage assembly comprises two first stage rails, each of which is supported by a respective one of two rail supports that are supported on opposite sides of the table top, each of the two first stage rails being movable relative to the two rail supports in the first direction.

12. The table extension system of claim 11, the second stage assembly comprising:

two second stage rails, each of which is supported by a respective one of the two first stage rails and is configured to be movable relative to the respective one of the two first stage rails in the first direction, the two second stage rails configured to support the rip fence.

13. The table extension system of claim 12, further comprising:

a second stage lock mechanism having a locked state in which the second stage assembly is fixed relative to the first stage assembly and an unlocked state in which the second stage assembly is movable relative to the first stage assembly in the first direction.

14. The table extension system of claim 13, wherein:

at least one second stage rail of the two second stage rails comprises a side wall, a first boss extending from the side wall, and a second boss extending from the side wall; and the second stage lock mechanism includes a locking member configured to interact with the first boss to lock the second stage assembly in the second stage extended position and to interact with the second boss to lock the second stage assembly in the second stage retracted position.

15. The table extension system of claim 14, wherein:

at least one first stage rail of the two first stage rails includes a first portion that defines an interior channel extending along a longitudinal length of the at least one first stage rail;

the at least one second stage rail further comprises a guide boss extending from the side wall and which is positioned in the interior channel, the guide boss being movable within the interior channel in the first direction and the at least one second stage rail being pivotable about the guide boss when the second stage lock mechanism is unlocked;

the first portion of the at least one first stage rail defines a first notch and a second notch, each of which opens into the interior channel;

the first boss is configured be positioned in the second notch so as to interact with the first portion of the at least one first stage rail to disable movement of the second stage assembly in the first direction when the second stage assembly is in the second stage extended position;

the first boss is configured to be positioned in the first notch and the second boss is configured to be positioned in the second notch such that the first and second bosses interact with the first portion of the at least one first stage rail to disable movement of the second stage assembly in the first direction when the second stage assembly is in the second stage retracted position; and when the second stage lock mechanism is unlocked, the at second stage assembly is pivotable relative to the first stage assembly about the guide boss from a first position, in which at least one of the first and second bosses is in at least one of the first and second notches, to a second position, in which the first and second notches are not in either of the first and second notches and the second stage assembly is movable in the first direction between the second stage retracted and second stage extended positions.

16. A table extension system for a table saw, comprising:

a first stage assembly configured to be supported by a table top of the table saw, the first stage assembly movable relative to the table top between a first stage retracted position and a first stage extended position; and a second stage assembly supported by the first stage assembly and movable relative to the first stage assembly between a second stage retracted position and a second stage extended position, the second stage assembly configured to support a rip fence of the table saw in such a way that the rip fence is movable relative to the second stage assembly, wherein:

the first stage assembly is movable relative to the table top in a first direction perpendicular to a cutting plane defined by a saw of the table saw;

the second stage assembly is movable relative to the first stage assembly in the first direction; and the first stage assembly further comprises two first stage rails, each of which is supported by a respective one of two rail supports that are supported on opposite sides of the table top, each of the two first stage rails being movable relative to the two rail supports in the first direction.

* * * * *